(12) United States Patent
Isono

(10) Patent No.: US 6,239,921 B1
(45) Date of Patent: May 29, 2001

(54) TAKING LENS SYSTEM

(75) Inventor: Masashi Isono, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/457,747

(22) Filed: Dec. 10, 1999

(30) Foreign Application Priority Data

Dec. 11, 1998 (JP) .................................................. 10-353181
Dec. 11, 1998 (JP) .................................................. 10-353431

(51) Int. Cl.$^7$ ........................... G02B 13/18; G02B 13/04; G02B 9/34
(52) U.S. Cl. .......................... 359/717; 359/740; 359/753; 359/765; 359/770; 359/774; 359/783; 359/794
(58) Field of Search ..................................... 359/717, 740, 359/753, 765, 770, 774, 783, 794

(56) References Cited

U.S. PATENT DOCUMENTS 5,961,999   1/1999   Tada ...................................... 359/752

FOREIGN PATENT DOCUMENTS

| 8-152557 | 5/1996 | (JP) . |
| 9-113799 | 5/1997 | (JP) . |
| 9-166748 | 6/1997 | (JP) . |
| 9-222558 | 8/1997 | (JP) . |
| 9-297264 | 11/1997 | (JP) . |
| 10-78545 | 3/1998 | (JP) . |
| 10-227973 | 8/1998 | (JP) . |
| 10-293246 | 11/1998 | (JP) . |
| 10-293247 | 11/1998 | (JP) . |

*Primary Examiner*—Scott J. Sugarman
*Assistant Examiner*—Evelyn A. Lester
(74) *Attorney, Agent, or Firm*—Burns, Doane, Swecker & Mathis, LLP

(57) ABSTRACT

A taking lens system has, from the object side, a front lens unit, an aperture stop, and a rear lens unit. The front lens unit is composed of two lens elements that are, from the object side, a positive glass element and a negative plastic lens element. The rear lens unit has a positive plastic lens element disposed at the image-side end thereof. On the object side of this positive plastic lens element is disposed solely a lens element made of glass. The following condition is fulfilled:

$$|f{\times}fa/Ha^2+f{\times}fb/Hb^2|\leq 300$$

where f represents the focal length of the entire taking lens system; fa represents the focal length of the negative plastic lens element of the front lens unit; fb represents the focal length of the positive plastic lens element of the rear lens unit; Ha represents the height of incidence at which an axial F-number ray enters the negative plastic lens element of the front lens unit; and Hb represents the height of incidence at which an axial F-number ray enters the positive plastic lens element of the rear lens unit.

34 Claims, 12 Drawing Sheets

FNO=2.87

-0.05  0.05
SPHERICAL   SINE
ABERRATION  CONDITION

Y'=3.36

-0.05  0.05
ASTIGMATISM

Y'=3.36

-2.0   2.0
DISTORTION%

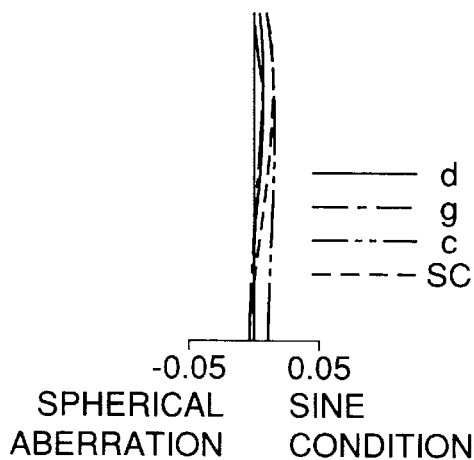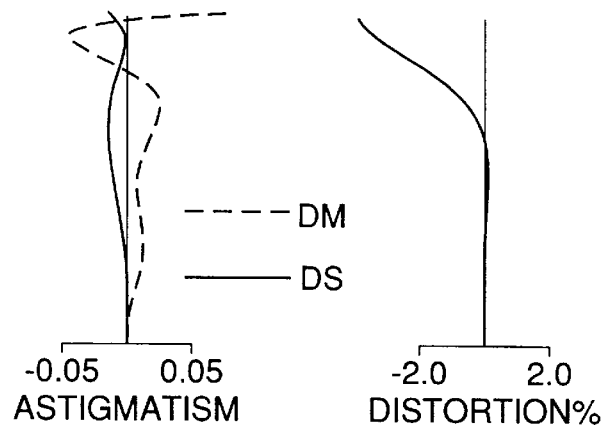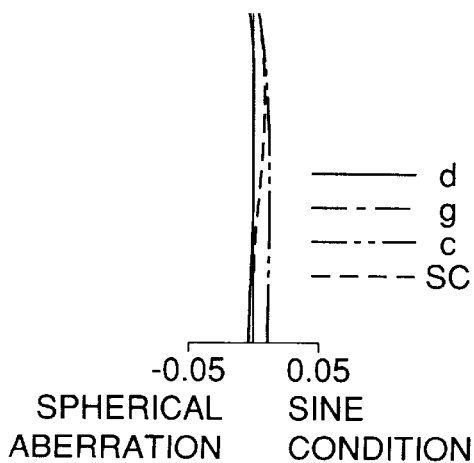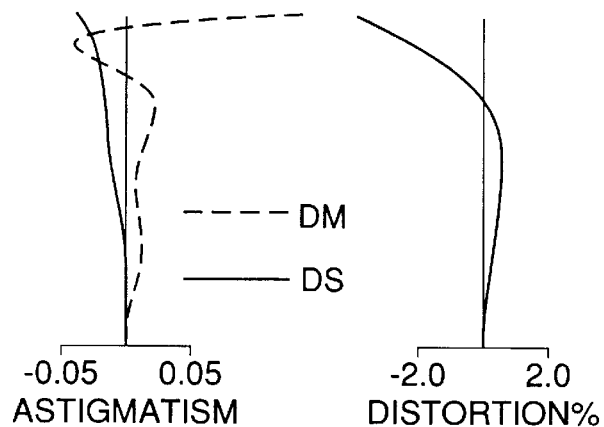

FNO=2.87
-0.05  0.05
SPHERICAL  SINE
ABERRATION  CONDITION

Y'=3.36
-0.05  0.05
ASTIGMATISM

Y'=3.36
-2.0  2.0
DISTORTION%

FNO=2.87
-0.05  0.05
SPHERICAL  SINE
ABERRATION  CONDITION

Y'=3.36
-0.05  0.05
ASTIGMATISM

Y'=3.36
-2.0  2.0
DISTORTION%

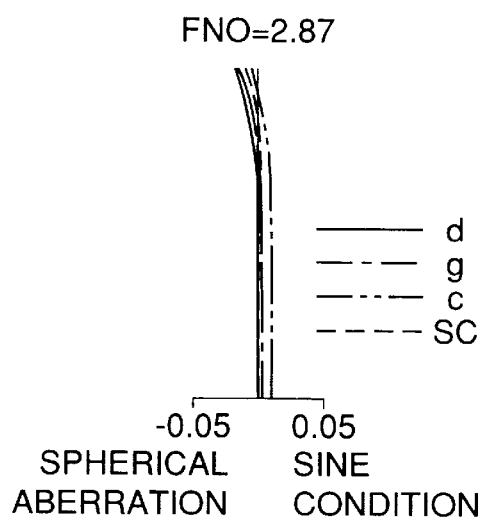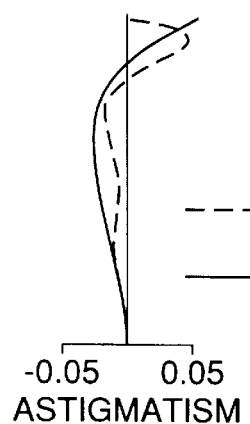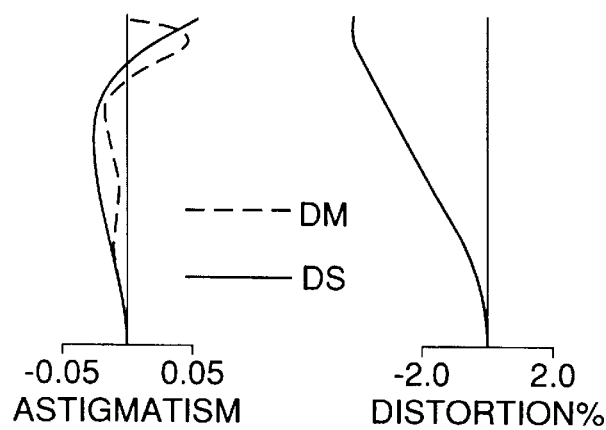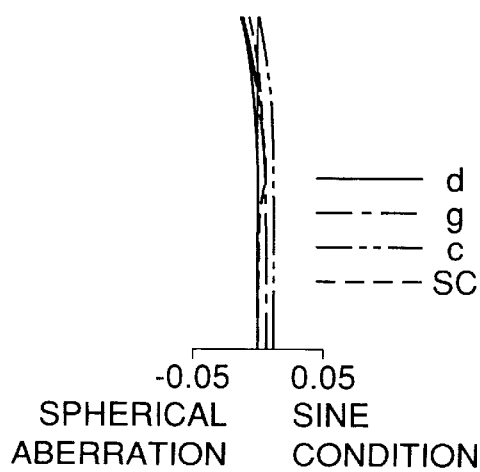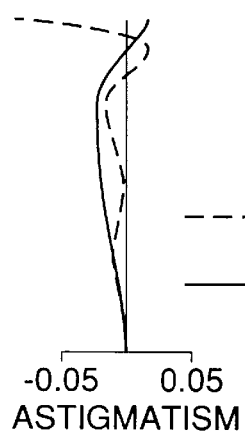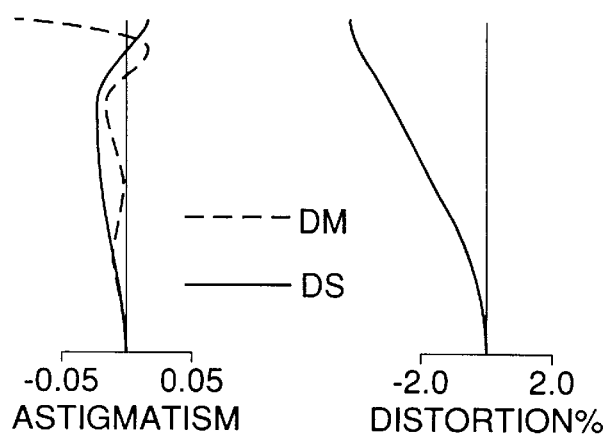

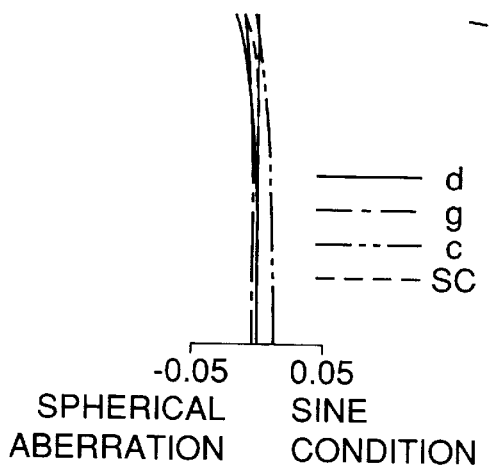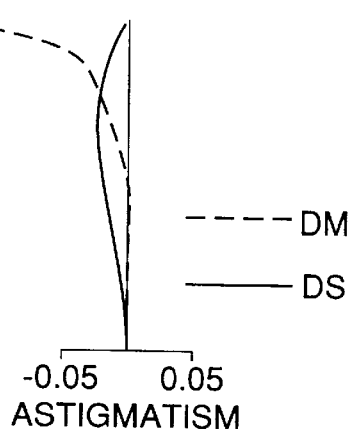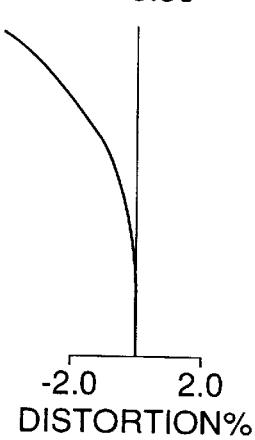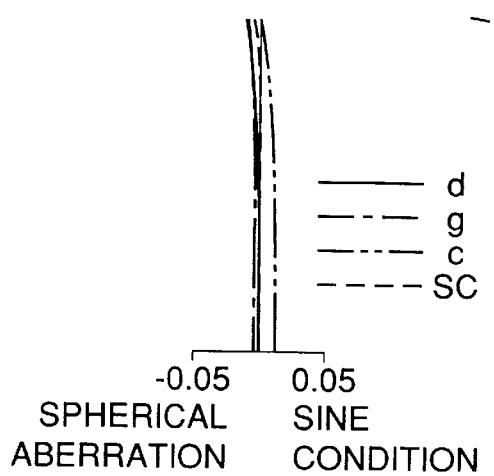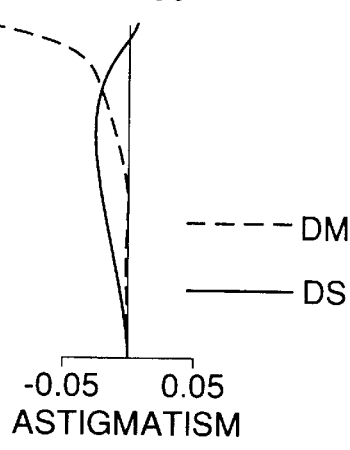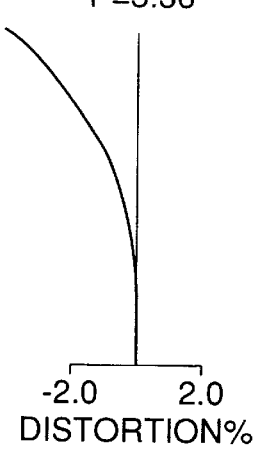

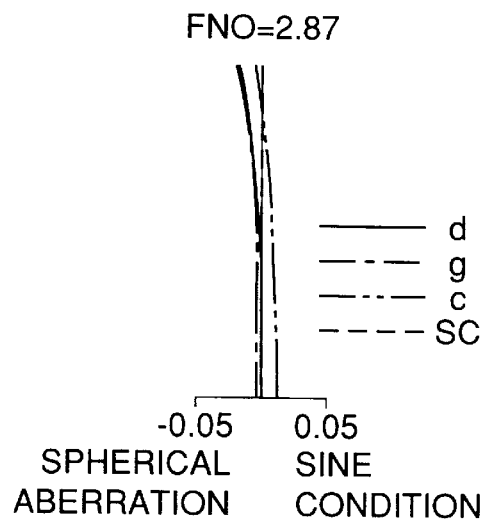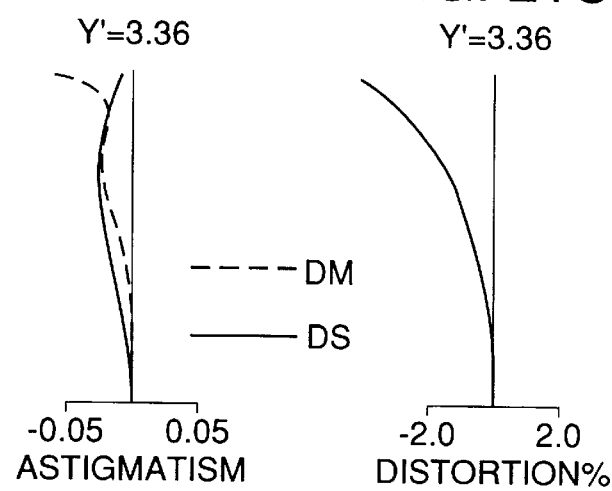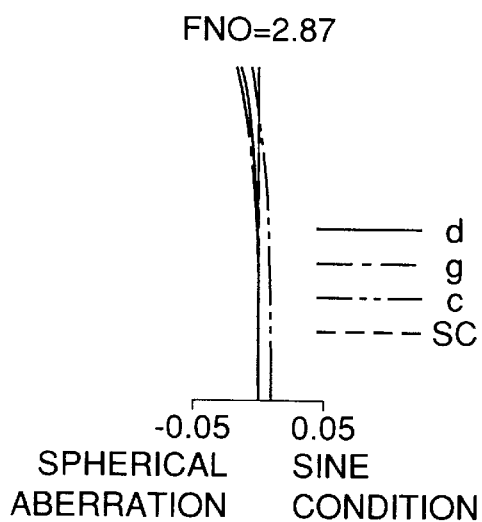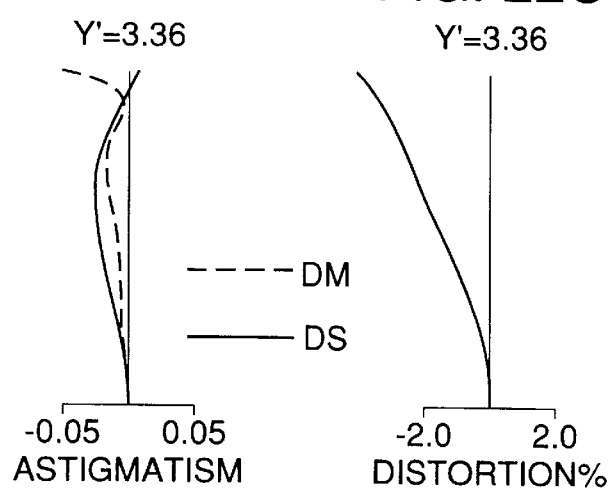

TAKING LENS SYSTEM

This disclosure is based on applications Nos. H10-353181 and H10-353431 filed in Japan on Dec. 11, 1998, the entire contents of which are hereby incorporated by reference.

BACKGROUND OF THE INVENTION

1. Field of the Invention

The present invention relates to a compact taking lens system, and more particularly to a low-cost, compact taking lens system suitable for use in a digital input apparatus such as a digital still camera or digital video camera.

2. Description of the Prior Art

In recent years, as personal computers become prevalent, digital still cameras, digital video cameras, and the like (hereafter referred to simply as digital cameras) that allow easy storage of image data in a digital format are becoming more and more popular for personal use. Such digital cameras are expected to become further more widespread as an apparatus for inputting image data.

On the other hand, digital cameras have come to employ smaller and smaller solid-state imaging devices, for example, CCDs (charge-coupled device), and therefore digital cameras themselves are quite naturally expected to be made more and more compact. Consequently, further miniaturization is eagerly sought also in taking lens systems, because they occupy the largest space within a digital input apparatus. Furthermore, the recent market competition for lower prices demands accordingly inexpensive taking lens systems. To cope with such requirements, Japanese Laid-open Patent Applications Nos. H9-133859, H9-222555, and H10-48515 propose compact taking lens systems for use in a digital camera that are composed of as few as four to five lens elements in total. Japanese Laid-open Patent Applications Nos. H9-43512, H9-166748, and H10-20188 also propose compact taking lens systems for use in a digital camera that are composed of as few as five to six lens elements in total. Considering that silver-halide-film-based lens shutter cameras have recently come to employ increasingly and often strikingly compact taking lens systems, it is also possible to apply such taking lens systems to digital cameras.

The taking lens systems proposed in the above-mentioned patent applications are compact, but, because all of their constituent lens elements are made of glass, it is impossible to achieve cost reduction. On the other hand, even if a taking lens system designed for use in a lens-shutter camera is employed intact in a digital camera, it is impossible to make efficient use of the light-condensing ability of microlenses disposed on the front surface of a solid-state imaging device. This is because, in a taking lens system designed for a lens-shutter camera, the exit pupil is placed so close to the image plane that off-axial light rays exiting from the taking lens system are obliquely incident on the image plane. This makes efficient use of the light-condensing ability of the microlenses impossible, and, as a result, the image suffers from uneven brightness between the central and peripheral portions thereof. This problem can be solved by placing the exit pupil farther away from the image plane, which, however, cannot be realized without making the taking lens system as a whole unduly large.

SUMMARY OF THE INVENTION

An object of the present invention is to provide a low-cost, compact taking lens system that offers sufficiently high optical performance.

To achieve the above object, according to one aspect of the present invention, a taking lens system is provided with, from the object side, a front lens unit, an aperture stop, and a rear lens unit. The front lens unit is composed of two lens elements that are, from the object side, a positive glass lens element and a negative plastic lens element. The rear lens unit has a positive plastic lens element disposed at the image-side end thereof. On the object side of this positive plastic lens element is disposed solely a lens element made of glass. In the taking lens system, the following condition is fulfilled:

$$|f \times fa/Ha^2 + f \times fb/Hb^2| \leq 300$$

where
- f represents the focal length of the entire taking lens system;
- fa represents the focal length of the negative plastic lens element of the front lens unit;
- fb represents the focal length of the positive plastic lens element of the rear lens unit;
- Ha represents the height of incidence at which an axial F-number ray enters the negative plastic lens element of the front lens unit; and
- Hb represents the height of incidence at which an axial F-number ray enters the positive plastic lens element of the rear lens unit.

According to another aspect of the present invention, a taking lens system is provided with, from the object side, a front lens unit, an aperture stop, and a rear lens unit. The front lens unit is composed of two lens elements that are, from the object side, a negative plastic lens element and a positive glass lens element. The rear lens unit has a positive plastic lens element disposed at the image-side end thereof. On the object side of this positive plastic lens element is disposed solely a lens element made of glass. In the taking lens system, the following condition is fulfilled:

$$|f \times fa/Ha^2 + f \times fb/Hb^2| \leq 5$$

where
- f represents the focal length of the entire taking lens system;
- fa represents the focal length of the negative plastic lens element of the front lens unit;
- fb represents the focal length of the positive plastic lens element of the rear lens unit;
- Ha represents the height of incidence at which an axial F-number ray enters the negative plastic lens element of the front lens unit; and
- Hb represents the height of incidence at which an axial F-number ray enters the positive plastic lens element of the rear lens unit.

BRIEF DESCRIPTION OF THE DRAWINGS

This and other objects and features of this invention will become clear from the following description, taken in conjunction with the preferred embodiments with reference to the accompanying drawings in which:

FIGS. 5A to 5C are graphic representations of the aberrations observed in the taking lens system of Example 2;

FIGS. 6A to 6C are graphic representations of the aberrations observed in the taking lens system of Example 3;

FIGS. 17A to 17C are graphic representations of the aberrations observed in the taking lens system of Example 6;

FIGS. 18A to 18C are graphic representations of the aberrations observed in the taking lens system of Example 7;

FIGS. 19A to 19C are graphic representations of the aberrations observed in the taking lens system of Example 8;

FIGS. 20A to 20C are graphic representations of the aberrations observed in the taking lens system of Example 9;

FIGS. 21A to 21C are graphic representations of the aberrations observed in the taking lens system of Example 10;

FIGS. 22A to 22C are graphic representations of the aberrations observed in the taking lens system of Example 11.

DESCRIPTION OF THE PREFERRED EMBODIMENTS

Hereinafter, taking lens systems embodying the present invention will be described with reference to the drawings. Note that, in the context of the present invention, "optical power" refers to a quantity that is represented as a reciprocal of focal length, and the deflection resulting from an optical power includes not only deflection occurring at the interface between two media having different refractive indices, but also deflection resulting from diffraction, deflection resulting from a refractive index gradient within a medium, and the like. On the other hand, a "refractive power" refers specifically to an "optical power" resulting from deflection occurring at the interface between two media having different refractive indices.

<Embodiments 1 to 3>

Figure 1:
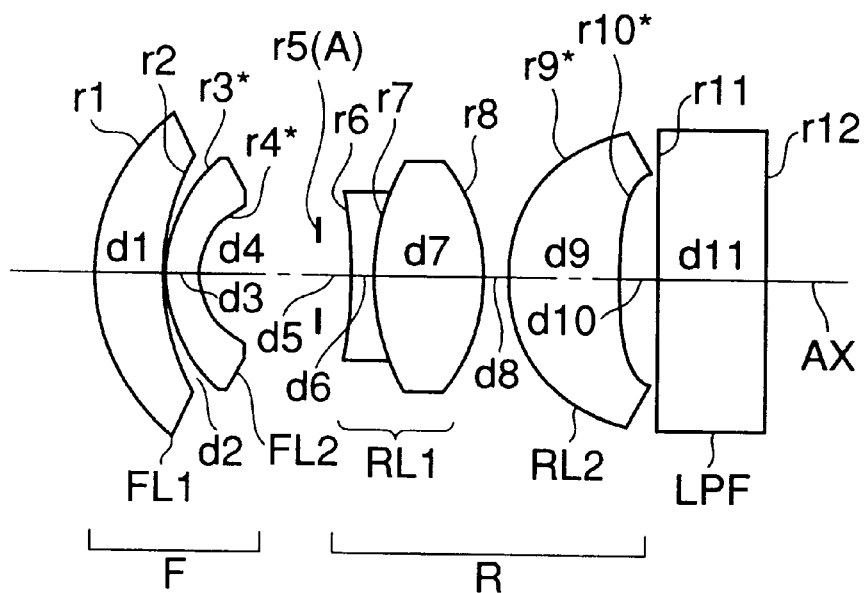
FIG. 1 is a lens arrangement diagram of the taking lens system of a first embodiment (Example 1) of the present invention.
Figure 2:
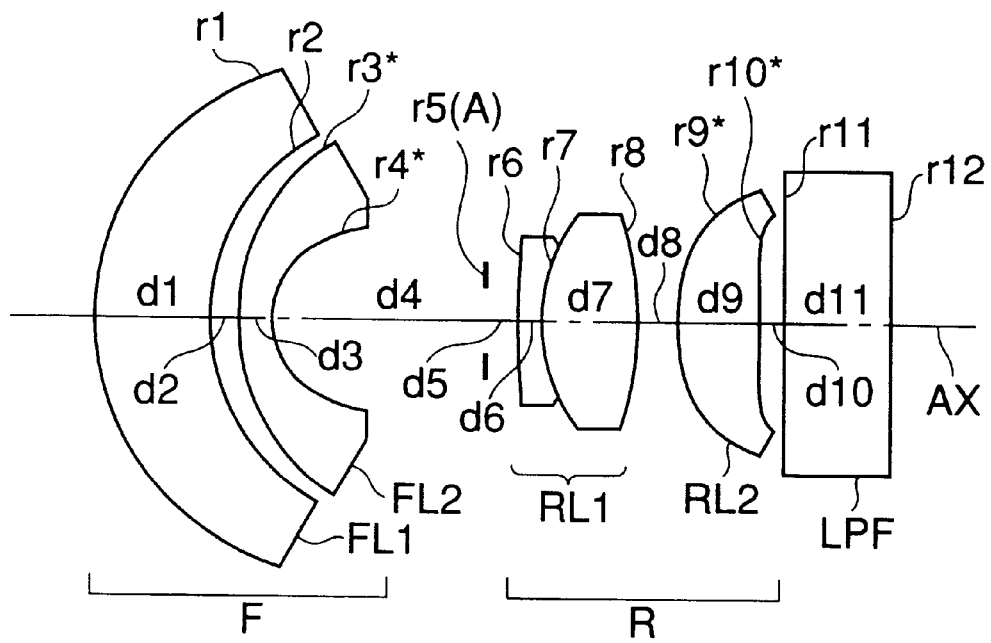
FIG. 2 is a lens arrangement diagram of the taking lens system of a second embodiment (Example 2) of the present invention.
Figure 3:
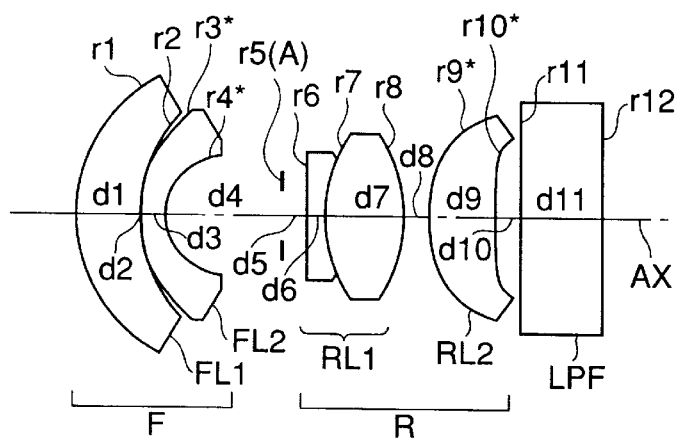
FIG. 3 is a lens arrangement diagram of the taking lens system of a third embodiment (Example 3) of the present invention.
Figure 4A:
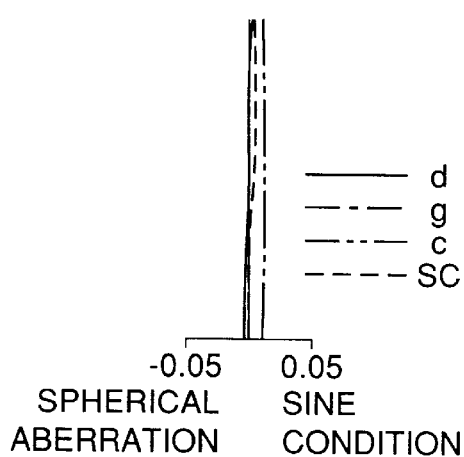
FIGS. 4A to 4C are graphic representations of the aberrations observed in the taking lens system of Example 1.
Figure 4B:
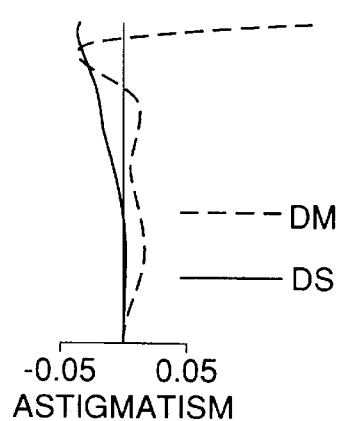
Figure 4C:
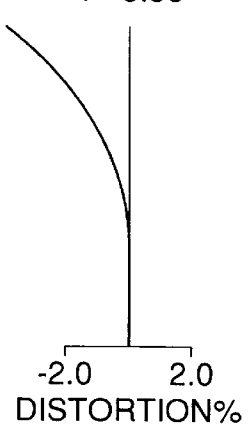
Figure 7:
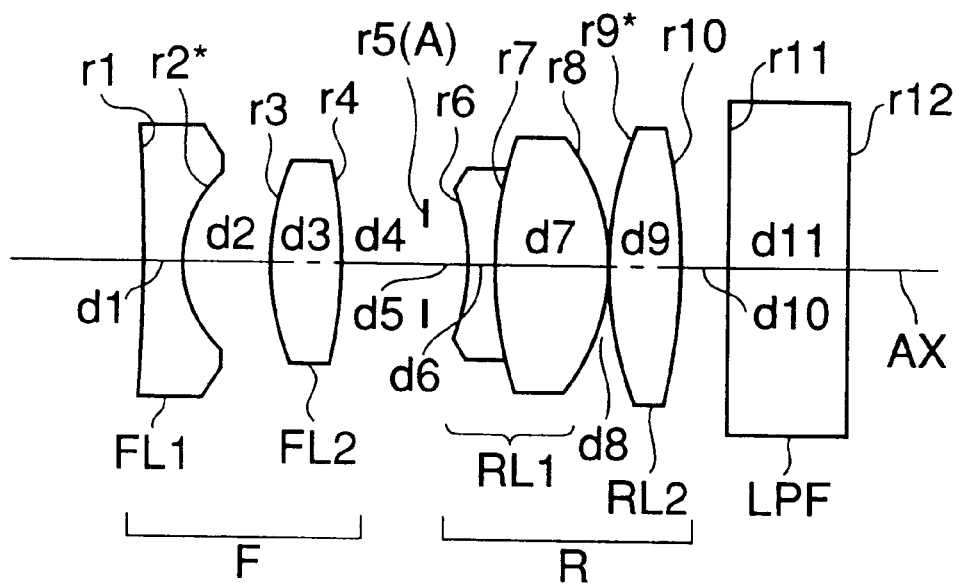
FIG. 7 is a lens arrangement diagram of the taking lens system of a fourth embodiment (Example 4) of the present invention.
Figure 8:
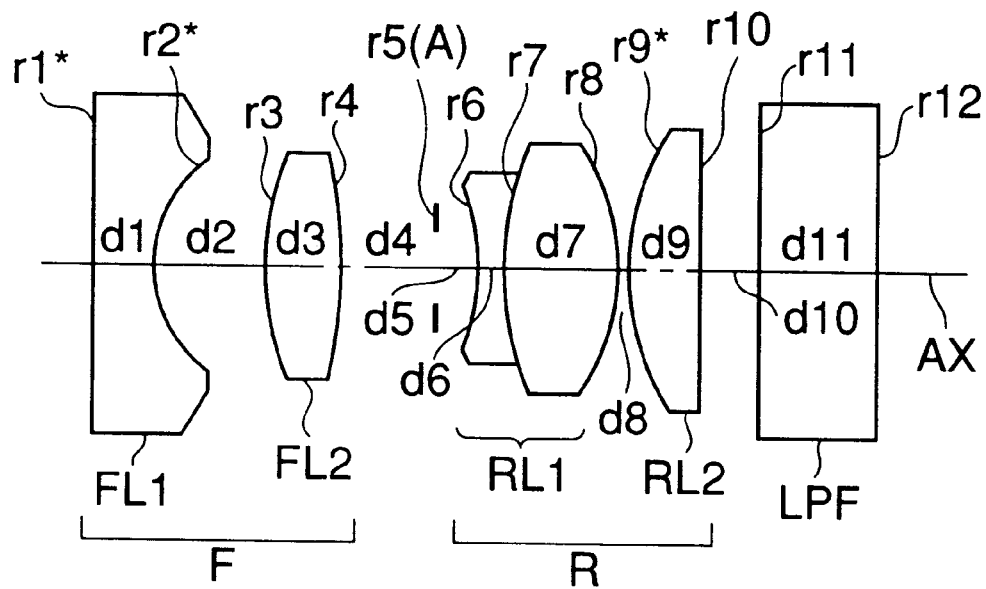
FIG. 8 is a lens arrangement diagram of the taking lens system of a fifth embodiment (Example 5) of the present invention.
Figure 9:
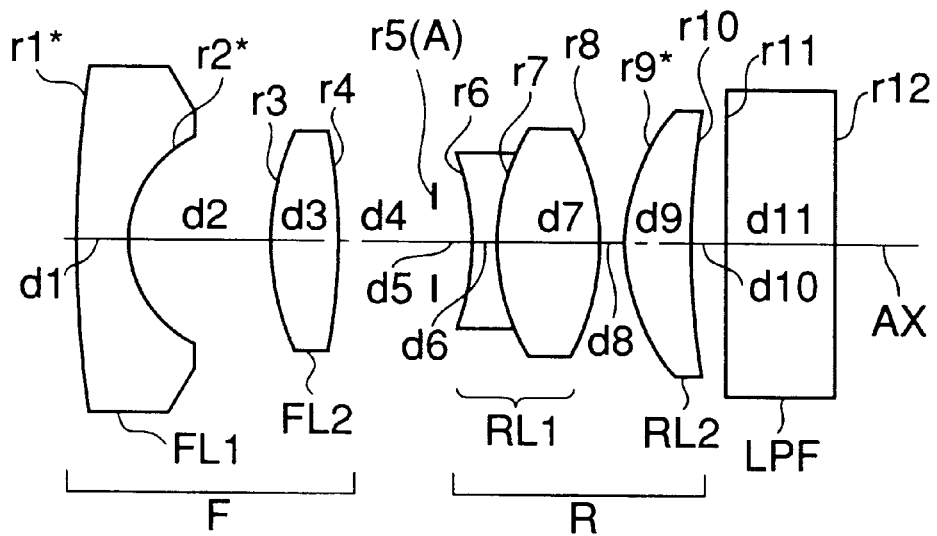
FIG. 9 is a lens arrangement diagram of the taking lens system of a sixth embodiment (Example 6) of the present invention.
Figure 10:
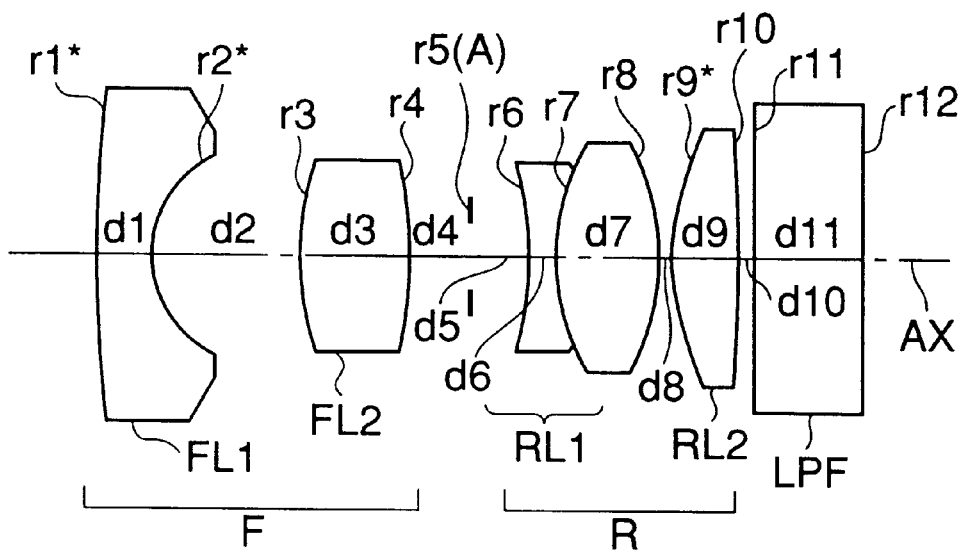
FIG. 10 is a lens arrangement diagram of the taking lens system of a seventh embodiment (Example 7) of the present invention.
Figure 11:
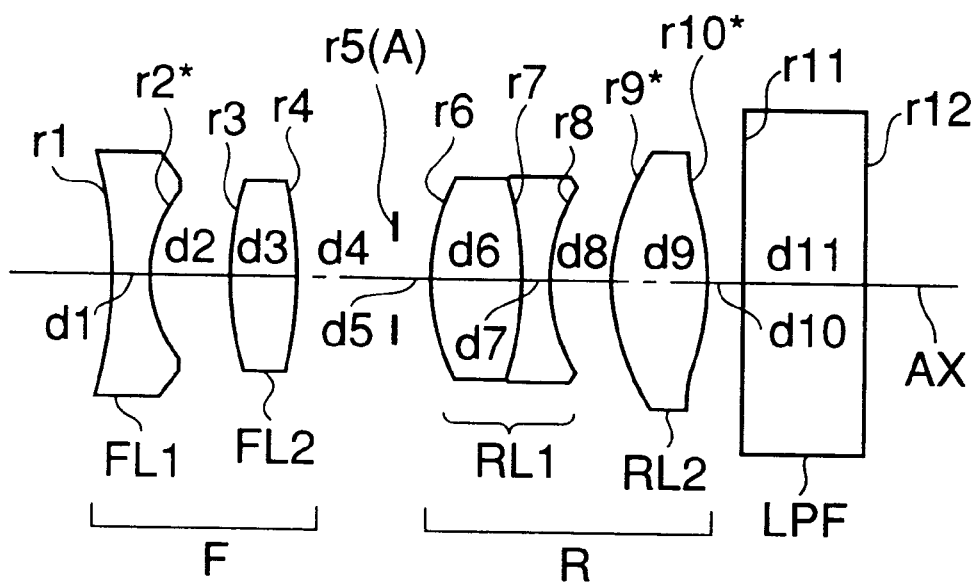
FIG. 11 is a lens arrangement diagram of the taking lens system of an eighth embodiment (Example 8) of the present invention.
Figure 12:
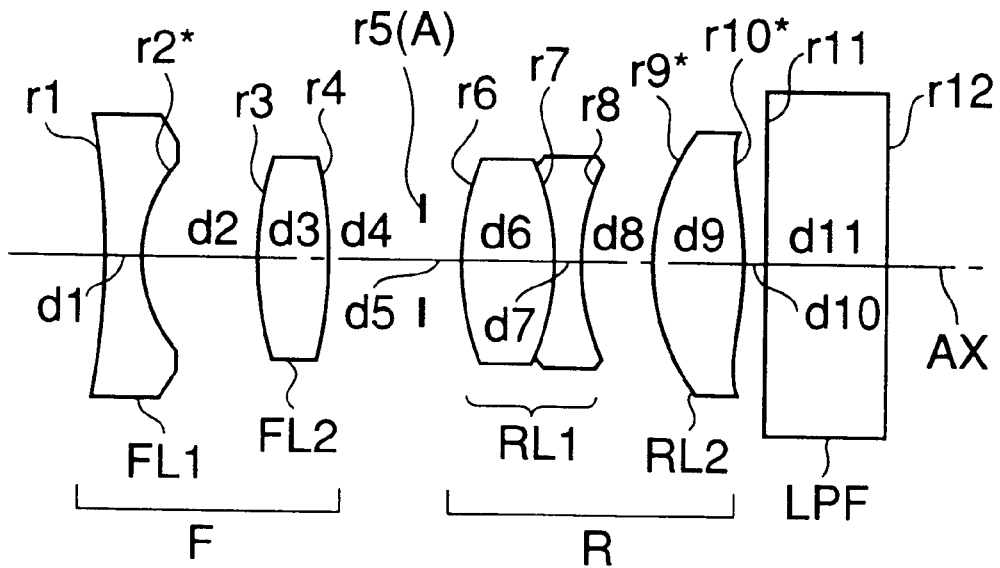
FIG. 12 is a lens arrangement diagram of the taking lens system of a ninth embodiment (Example 9) of the present invention.
Figure 13:
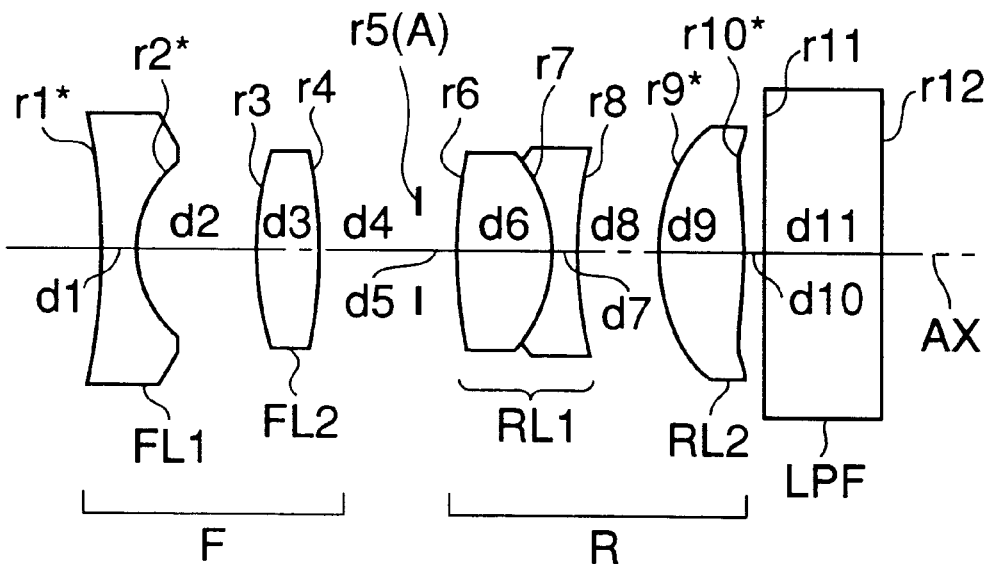
FIG. 13 is a lens arrangement diagram of the taking lens system of a tenth embodiment (Example 10) of the present invention.
Figure 14:
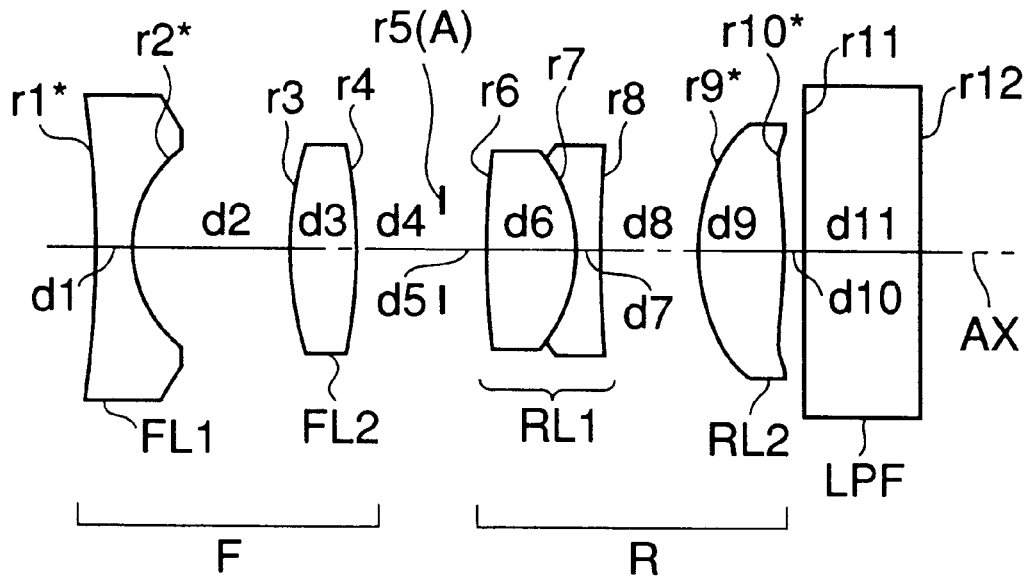
FIG. 14 is a lens arrangement diagram of the taking lens system of an eleventh embodiment (Example 11) of the present invention.
Figure 15A:
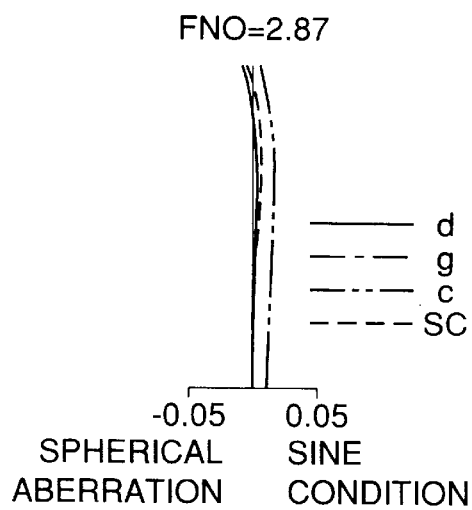
FIGS. 15A to 15C are graphic representations of the aberrations observed in the taking lens system of Example 4.
Figure 15B:
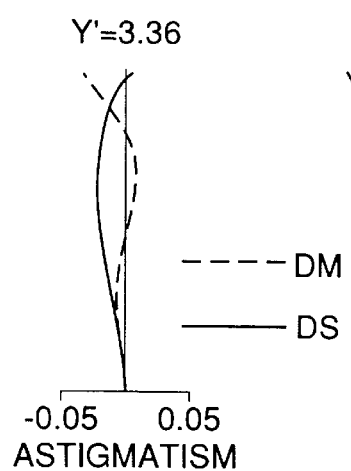
Figure 15C:
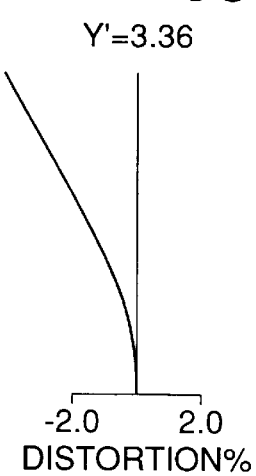
Figure 16A:
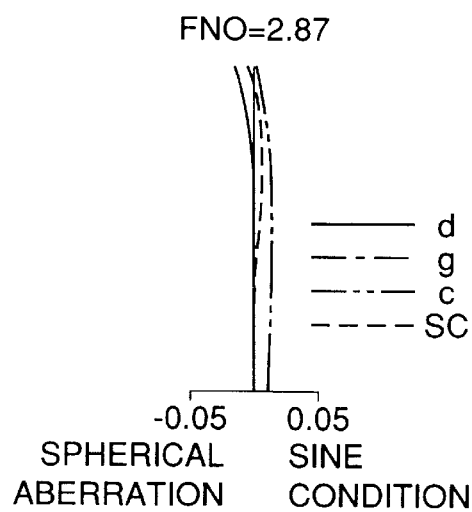
FIGS. 16A to 16C are graphic representations of the aberrations observed in the taking lens system of Example 5.
Figure 16B:
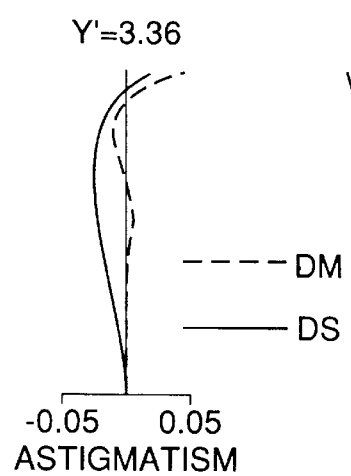
Figure 16C:
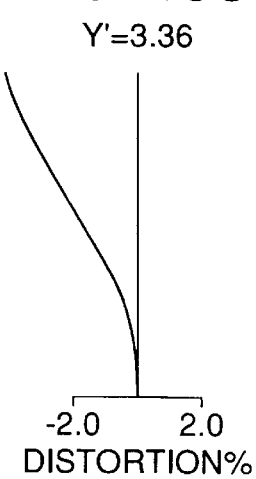
Figure 23:
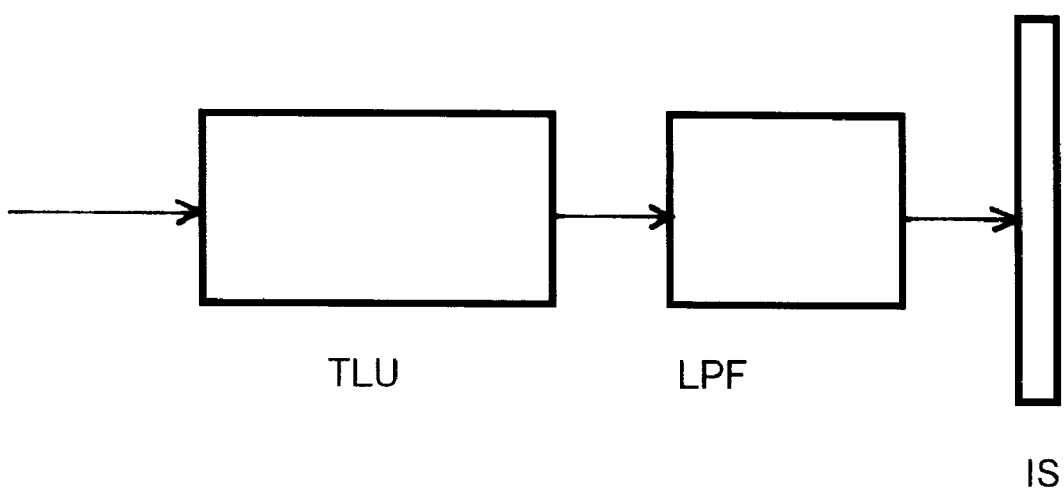
FIG. 23 is a block diagram illustrating the relative arrangement of optical components in a digital camera.

FIGS. 1 to 3 are lens arrangement diagrams of the taking lens systems of a first, a second, and a third embodiment, respectively, of the present invention, each figure schematically illustrating a cross-section of the lens arrangement. In each lens arrangement diagram, a surface marked with ri (i=1, 2, 3, ... ) is the ith surface counted from the object (i.e. the subject) side, and a surface ri marked with an asterisk (*) is an aspherical surface. Furthermore, an axial distance marked with di (i=1, 2, 3, ... ) is the ith axial distance counted from the object side. The taking lens systems of the first to third embodiments, which are designed for use in a digital camera, are all composed of, from the object side, a front lens unit (F) having a negative optical power, an aperture stop (A), a rear lens unit (R) having a positive optical power, and a low-pass filter (LPF). Within the digital camera, the light rays from the object pass through the taking lens system (TLS) and the low-pass filter (LPF), and are focused upon an image sensor (IS), such as a charge-coupled device, as illustrated in FIG. 23.

In the taking lens systems of the first and third embodiments (FIGS. 1 and 3), the lens units (F and R) are each composed, from the object side, as follows. The front lens unit (F) is composed of a positive meniscus lens element (FL1) convex to the object side and a negative meniscus lens element (FL2) convex to the object side. The positive meniscus lens element (FL1) is made of a glass material, and the negative meniscus lens element (FL2) is made of a plastic material. Moreover, the negative meniscus lens element (FL2) has aspherical surfaces on both sides. The rear lens unit (R) is composed of a doublet lens element (RL1) formed by cementing together a biconcave lens element and a biconvex lens element, and a positive meniscus lens element (RL2) convex to the object side. The doublet lens element (RL1) is made of a glass material, and the positive meniscus lens element (RL2) is made of a plastic material. Moreover, the positive meniscus lens element (RL2) has aspherical surfaces on both sides.

In the taking lens system of the second embodiment (FIG. 2), the lens units (F and R) are each composed, from the object side, as follows. The front lens unit (F) is composed of a positive meniscus lens element (FL1) convex to the object side and a negative meniscus lens element (FL2) convex to the object side. The positive meniscus lens element (FL1) is made of a glass material, and the negative meniscus lens element (FL2) is made of a plastic material. Moreover, the negative meniscus lens element (FL2) has aspherical surfaces on both sides. The rear lens unit (R) is composed of a doublet lens element (RL1) formed by cementing together a negative meniscus lens element convex to the object side and a biconvex lens element, and a positive meniscus lens element (RL2) convex to the object side. The doublet lens element (RL1) is made of a glass material, and the positive meniscus lens element (RL2) is made of a plastic material. Moreover, the positive meniscus lens element (RL2) has aspherical surfaces on both sides.

As described above, the taking lens systems of the first to third embodiments are provided with, from the object side, a front lens unit (F), an aperture stop (A), and a rear lens unit (R). The front lens unit (F) is composed of two lens elements that are, from the object side, a positive glass lens element (FL1) and a negative plastic lens element (FL2). The rear lens unit (R) has a positive plastic lens element (RL2) disposed at the image-side end thereof. On the object side of the positive plastic lens element (RL2) is disposed solely a lens element (RL1) made of glass. By designing a taking lens system in this way, it is possible to satisfactorily suppress the variation in the back focal distance caused by variation in temperature that is associated with the use of plastic lens elements, and to realize a low-cost taking lens system that corrects aberrations properly in a compact structure.

Moreover, it is preferable to use, as in the taking lens systems of the first to third embodiments, a doublet lens element (RL1) as a glass lens element provided in the rear lens unit (R). The use of a doublet lens element composed of a negative and a positive lens element cemented together helps simplify the handling as well as the lens frame design of this lens element. Moreover, a doublet lens element does not require an air gap, and therefore its use is advantageous to miniaturization.

In all of the first to third embodiments, the taking lens system adopts a total movement focusing method in which focusing from a condition focused on an infinite distance to a condition focused on a close distance is achieved by moving all of its constituent components including the front and rear lens units (F and R) toward the object side. Alternatively, it is also possible to achieve focusing in any other manner, for example, by moving the front and rear lens units (F and R) while varying the distance therebetween, or by moving the whole or a part of the front lens unit (F), or by moving the whole or a part of the rear lens unit (R).

Next, the conditions to be preferably fulfilled by the taking lens systems of the first to third embodiments will be described. Note that, in any of the taking lens systems of the first to third embodiments, it is not necessary that all of the conditions given below be fulfilled simultaneously; if any of those conditions are fulfilled, it is possible to achieve the corresponding advantages. It is needless to say, however, that more than one condition should preferably be fulfilled to obtain satisfactory results in terms of optical performance, miniaturization, and simplicity of assembly.

It is preferable that Condition (1) below be fulfilled. Moreover, it is more preferable that Condition (1') below be additionally fulfilled.

$$|f \times fa/Ha^2 + f \times fb/Hb^2| \leq 300 \tag{1}$$

$$|f \times fa/Ha^2 + f \times fb/Hb^2| \leq 150 \tag{1'}$$

where
  f represents the focal length of the entire taking lens system;
  fa represents the focal length of the negative plastic lens element (FL2) provided in the front lens unit (F);
  fb represents the focal length of the positive plastic lens element (RL2) provided in the rear lens unit (R);
  Ha represents the height of incidence at which an axial F-number ray enters the negative plastic lens element (FL2) provided in the front lens unit (F); and
  Hb represents the height of incidence at which an axial F-number ray enters the positive plastic lens element (RL2) provided in the rear lens unit (R).

Condition (1) defines the condition to be fulfilled, in particular, to satisfactorily suppress variation in the back focal distance caused by temperature variation. If the value of Condition (1) is greater than its upper limit, the back focal distance varies so greatly with temperature that the optical performance degrades significantly as temperature varies. Condition (1') defines a more preferable condition than that defined by Condition (1) to be fulfilled to satisfactorily suppress the variation in the back focal distance.

It is preferable that Condition (2) below be fulfilled.

$$3 \leq |(r1A + r1B)/(r1A - r1B)| \leq 100 \tag{2}$$

where
  r1A represents the radius of curvature (r1) of the object-side surface of the positive object-side-end lens element (FL1); and
  r1B represents the radius of curvature (r2) of the image-side surface of the positive object-side-end lens element (FL1).

Condition (2) defines the condition to be fulfilled, in particular, to achieve well-balanced correction of coma aberration. If the value of Condition (2) is less than its lower limit, coma aberration becomes so large as to have unduly adverse effects on high-order lateral chromatic aberration. In contrast, if the value of Condition (2) is greater than its upper limit, coma aberration becomes so large as to have unduly adverse effects on astigmatism.

It is preferable that Condition (3) below be fulfilled.

$$0.0 \leq f/f1 \leq 0.21 \tag{3}$$

where
  f1 represents the focal length of the positive object-side-end lens element (FL1).

Condition (3) defines the condition to be fulfilled, in particular, to strike a proper balance between the total length and the aberration characteristics. If the value of Condition (3) is less than its lower limit, aberrations can be corrected properly, but simultaneously the total length of the taking lens system needs to be made unduly long. An unduly long total length demands an unduly large diameter in the front lens unit, and thus makes the taking lens system as a whole unduly large. In contrast, if the value of Condition (3) is greater than its upper limit, the total length of the taking lens system is successfully minimized, but simultaneously aberrations (in particular, distortion and curvature of field) become unduly large.

It is preferable that Condition (4) below be fulfilled.

$$-5.0 \leq (r5A + r5B)/(r5A - r5B) \leq -0.5 \tag{4}$$

where
  r5A represents the radius of curvature (r9) of the object-side surface of the positive image-side-end lens element (RL2); and
  r5B represents the radius of curvature (r10) of the image-side surface of the positive image-side-end lens element (RL2).

Condition (4) defines the condition to be fulfilled, in particular, to achieve well-balanced correction of coma aberration. If the value of Condition (4) is less than its lower limit, coma aberration becomes so large as to have unduly adverse effects on astigmatism. In contrast, if the value of Condition (4) is greater than its upper limit, coma aberration becomes so large as to have unduly adverse effects on high-order lateral chromatic aberration.

It is preferable that Condition (5) below be fulfilled.

$$0.05 \leq D/f \leq 0.50 \tag{5}$$

where

D represents the air gap (d8) between the positive image-side-end lens element (RL2) and the lens element (RL1) disposed on the object side of the positive image-side-end lens element (RL2).

Condition (5) defines the condition to be fulfilled, in particular, to strike a proper balance between the total length and the aberration characteristics. If the value of Condition (5) is less than its lower limit, the total length of the taking lens system is successfully minimized, but simultaneously aberrations (in particular, distortion and curvature of field) become unduly large. In contrast, if the value of Condition (5) is greater than its upper limit, aberrations can be corrected properly, but simultaneously the total length of the taking lens system needs to be made unduly long. An unduly long total length demands an unduly large diameter in the front lens unit, and thus makes the taking lens system as a whole unduly large.

In a case where the negative lens element (FL2) of the front lens unit (F) is, at least on one side thereof, provided with an aspherical surface whose maximum effective radius is represented by ymax, it is preferable that Condition (6) below be fulfilled for a height y in a direction perpendicular to the optical axis in the range 0.7ymax<y<1.0ymax. In a case where the positive image-side-end lens element (RL2) of the rear lens unit (R) is, at least on one side thereof, provided with an aspherical surface whose maximum effective radius is represented by ymax, it is preferable that Condition (6) below be fulfilled for a height y in a direction perpendicular to the optical axis in the range 0.7ymax<y<1.0ymax. It is more preferable that both of the negative and positive lens elements (FL2 and RL2) be, at least on one side thereof, provided with an aspherical surface that fulfills Condition (6) below.

$$0.01 \leq (x-x0)/(N'-N) \leq 3.0 \tag{6}$$

where x represents the deviation (mm) of the aspherical surface along the optical axis (AX) at the height in a direction perpendicular to the optical axis (AX) (the direction pointing to the object side is negative);

x0 represents the deviation (mm) of the reference spherical surface of the aspherical surface along the optical axis (AX) at the height in a direction perpendicular to the optical axis (AX) (the direction pointing to the object side is negative);

N represents the refractive index of the object-side medium of the aspherical surface for the d line; and N' represents the refractive index of the image-side medium of the aspherical surface for the d line.

Here, x and x0, which represent the surface shape of the aspherical surface and the reference spherical surface, respectively, are defined specifically by Formulae (AS) and (RE) below, respectively, relative to the vertex.

$$x = (C0 \cdot y^2)/(1+\sqrt{1-\epsilon \cdot C0^2 \cdot y^2}) + \Sigma(Ai \cdot y^i) \tag{AS}$$

$$x0 = (C0 \cdot y^2)/(1+\sqrt{1-C0^2 \cdot y^2}) \tag{RE}$$

where y represents the height in a direction perpendicular to the optical axis (AX);

C0 represents the curvature of the reference spherical surface (i.e. the nominal curvature of the aspherical surface);

$\epsilon$ represents the quadric surface parameter; and

Ai represents the aspherical coefficient of the ith order.

Condition (6) defines the condition to be fulfilled, in particular, to correct distortion and curvature of field. If the value of Condition (6) is less than its lower limit, positive distortion increases, and simultaneously the inclination of the image plane toward the over side becomes unduly large. In contrast, if the value of Condition (6) is greater than its upper limit, negative distortion increases, and simultaneously the inclination of the image plane toward the under side becomes unduly large. This makes it impossible to realize a satisfactorily practical taking lens system. Note that, in a taking lens system that includes, as in the first to third embodiments, a plurality of aspherical surfaces, at least one of those aspherical surfaces needs to fulfill Condition (6) above; the other aspherical surfaces do not necessarily have to fulfill Condition (6) above, if that is advantageous for the correction of other aberrations.

It is preferable that Condition (7) below be fulfilled.

$$1 \leq img \times R \leq 15 \tag{7}$$

where img represents the maximum image height; and

R represents the effective diameter of the image-side-end surface.

Condition (7) defines the condition to be fulfilled to keep appropriate the size and the aberration characteristics of a taking lens system as well as the conditions expected to be fulfilled thereby when designed for use in a video camera. Usually, a solid-state imaging device (such as a CCD) designed for use in a video camera has microlenses disposed on the front surfaces of the individual light-sensing elements provided therein so as to enhance its light-sensing efficiency. To make efficient use of the light-condensing ability of those microlenses, it is essential to let rays enter the microlenses substantially parallel to their optical axes (i.e. substantially perpendicular to the light-sensing surface of the individual light-sensing elements). To achieve this, it is necessary to make the entire taking lens system substantially telecentric toward the image side. If the value of Condition (7) is greater than its upper limit, the entire taking lens system is too telecentric, and thus negative distortion becomes unduly large, and simultaneously the inclination of the image plane toward the under side becomes unduly large. In contrast, if the value of Condition (7) is less than its lower limit, it is difficult to make the entire taking lens system substantially telecentric. Even if the entire taking lens system can be made substantially telecentric, the back focal distance is then unduly long and thus the taking lens system as a whole is unduly large.

<Embodiments 4 to 11>

FIGS. 7 to 14 are lens arrangement diagrams of the taking lens systems of a fourth, a fifth, a sixth, a seventh, an eighth, a ninth, a tenth, and an eleventh embodiment, respectively, of the present invention, with each figure schematically illustrating a cross-section of the lens arrangement. In each lens arrangement diagram, a surface marked with ri (i=1, 2, 3, . . . ) is the ith surface counted from the object (i.e. the subject) side, and a surface ri marked with an asterisk (*) is an aspherical surface. Furthermore, an axial distance marked with di (i=1, 2, 3, . . . ) is the ith axial distance counted from the object side. The taking lens systems of the fourth to eleventh embodiments, which are designed for use in a digital camera, are all composed of, from the object side, a front lens unit (F) having a positive optical power, an aperture stop (A), a rear lens unit (R) having a positive optical power, and a low-pass filter (LPF).

In the taking lens system of the fourth embodiment (FIG. 7), the lens units (F and R) are each composed, from the object side, as follows. The front lens unit (F) is composed of a negative biconcave lens element (FL1) and a positive biconvex lens element (FL2). The negative lens element (FL1) is made of a plastic material, and the positive lens element (FL2) is made of a glass material. Moreover, the negative lens element (FL1) has an aspherical surface as its image-side surface. The rear lens unit (R) is composed of a doublet lens element (RL1) formed by cementing together a biconcave and a biconvex lens element, and a positive biconvex lens element (RL2). The doublet lens element (RL1) is made of a glass material, and the positive lens element (RL2) is made of a plastic material. In addition, the positive lens element (RL2) has an aspherical surface as its object-side surface.

In the taking lens systems of the fifth and sixth embodiments (FIGS. 8 and 9), the lens units (F and R) are each composed, from the object side, as follows. The front lens unit (F) is composed of a negative biconcave lens element (FL1) and a positive biconvex lens element (FL2). The negative lens element (FL1) is made of a plastic material, and the positive lens element (FL2) is made of a glass material. Moreover, the negative lens element (FL1) has aspherical surfaces on both sides. The rear lens unit (R) is composed of a doublet lens element (RL1) formed by cementing together a biconcave and a biconvex lens element, and a positive meniscus lens element (RL2) convex to the object side. The doublet lens element (RL1) is made of a glass material, and the positive meniscus lens element (RL2) is made of a plastic material. In addition, the positive meniscus lens element (RL2) has an aspherical surface as its object-side surface.

In the taking lens system of the seventh embodiment (FIG. 10), the lens units (F and R) are each composed, from the object side, as follows. The front lens unit (F) is composed of a negative biconcave lens element (FL1) and a positive biconvex lens element (FL2). The negative lens element (FL1) is made of a plastic material, and the positive lens element (FL2) is made of a glass material. Moreover, the negative lens element (FL1) has aspherical surfaces on both sides. The rear lens unit (R) is composed of a doublet lens element (RL1) formed by cementing together a biconcave and a biconvex lens element, and a positive biconvex lens element (RL2). The doublet lens element (RL1) is made of a glass material, and the positive lens element (RL2) is made of a plastic material. In addition, the positive lens element (RL2) has an aspherical surface as its object-side surface.

In the taking lens systems of the eighth and ninth embodiments (FIGS. 11 and 12), the lens units (F and R) are each composed, from the object side, as follows. The front lens unit (F) is composed of a negative biconcave lens element (FL1) and a positive biconvex lens element (FL2). The negative lens element (FL1) is made of a plastic material, and the positive lens element (FL2) is made of a glass material. Moreover, the negative lens element (FL1) has an aspherical surface as its image-side surface. The rear lens unit (R) is composed of a doublet lens element (RL1) formed by cementing together a biconvex and a biconcave lens element, and a positive biconvex lens element (RL2). The doublet lens element (RL1) is made of a glass material, and the positive lens element (RL2) is made of a plastic material. In addition, the positive lens element (RL2) has aspherical surfaces on both sides.

In the taking lens systems of the tenth and eleventh embodiments (FIGS. 13 and 14), the lens units (F and R) are each composed, from the object side, as follows. The front lens unit (F) is composed of a negative biconcave lens element (FL1) and a positive biconvex lens element (FL2). The negative lens element (FL1) is made of a plastic material, and the positive lens element (FL2) is made of a glass material. Moreover, the negative lens element (FL1) has aspherical surfaces on both sides. The rear lens unit (R) is composed of a doublet lens element (RL1) formed by cementing together a biconvex and a biconcave lens element, and a positive biconvex lens element (RL2). The doublet lens element (RL1) is made of a glass material, and the positive lens element (RL2) is made of a plastic material. In addition, the positive lens element (RL2) has aspherical surfaces on both sides.

As described above, the taking lens systems of the fourth to eleventh embodiments are provided with, from the object side, a front lens unit (F), an aperture stop (A), and a rear lens unit (R). The front lens unit (F) is composed of two lens elements that are, from the object side, a negative lens element (FL1) made of a plastic material and a positive lens element (FL2) made of a glass material. The rear lens unit (R) has a positive plastic lens element (RL2) disposed at the image-side end thereof. On the object side of the positive plastic lens element (RL2) is disposed solely a lens element (RL1) made of glass. By designing a taking lens system in this way, it is possible to satisfactorily suppress the variation in the back focal distance caused by variation in temperature as is associated with the use of plastic lens elements, and to realize a low-cost taking lens system that corrects aberrations properly in a compact structure.

Moreover, it is preferable that, as in the taking lens systems of the fourth to seventh embodiments, the rear lens unit (R) be composed of, from the object side, a doublet lens element (RL1) formed by cementing together a biconcave and a biconvex lens element, and a positive lens element (RL2) made of a plastic material. It is also preferable that, as in the taking lens systems of the eighth to eleventh embodiments, the rear lens unit (R) be composed of, from the object side, a doublet lens element (RL1) formed by cementing together a biconvex and a biconcave lens element, and a positive lens element (RL2) made of a plastic material. The use of a doublet lens element (RL1) composed of a negative and a positive lens element cemented together helps simplify the handling as well as the lens frame design of this lens element. Moreover, a doublet lens element does not require an air gap, and therefore its use is advantageous to miniaturization.

In all of the fourth to eleventh embodiments, the taking lens system adopts a "total movement" focusing method in which focusing from a condition focused on an infinite distance to a condition focused on a close distance is achieved by moving all of its constituent components including the front and rear lens units (F and R) toward the object side. Alternatively, it is also possible to achieve focusing in any other manner, for example, by moving the front and rear lens units (F and R) while varying the distance therebetween, or by moving the whole or a part of the front lens unit (F), or by moving the whole or a part of the rear lens unit (R).

Next, the conditions to be preferably fulfilled by the taking lens systems of the fourth to eleventh embodiments will be described. Note that, in any of the taking lens systems of the fourth to eleventh embodiments, it is not necessary that all of the conditions given below be fulfilled simultaneously; if any of those conditions are fulfilled, it is possible to achieve the corresponding advantages. It is needless to say, however, that more than one condition should preferably be fulfilled to obtain satisfactory results in terms of optical performance, miniaturization, and simplicity of assembly.

It is preferable that Condition (8) below be fulfilled. Moreover, it is more preferable that Condition (8') below be additionally fulfilled.

$$|f \times fa/Ha^2 + f \times fb/Hb^2| \leq 5 \quad (8)$$

$$|f \times fa/Ha^2 + f \times fb/Hb^2| \leq 2.5 \quad (8')$$

where f represents the focal length of the entire taking lens system;

fa represents the focal length of the negative plastic lens element (FL1) provided in the front lens unit (F);

fb represents the focal length of the positive plastic lens element (RL2) provided in the rear lens unit (R);

Ha represents the height of incidence at which an axial F-number ray enters the negative plastic lens element (FL1) provided in the front lens unit (F); and Hb represents the height of incidence at which an axial F-number ray enters the positive plastic lens element (RL2) provided in the rear lens unit (R).

Condition (8) defines the condition to be fulfilled, in particular, to satisfactorily suppress variation in the back focal distance caused by temperature variation. If the value of Condition (8) is greater than its upper limit, the back focal distance varies so greatly with temperature that the optical performance degrades significantly as temperature varies. Condition (8') defines a more preferable condition than that defined by Condition (8) to be fulfilled to satisfactorily suppress the variation in the back focal distance.

It is preferable that Condition (9) below be fulfilled.

$$0.01 \leq f/fF \leq 0.91 \quad (9)$$

where fF represents the focal length of the front lens unit (F).

Condition (9) defines the condition to be fulfilled, in particular, to strike a proper balance between the total length and the aberration characteristics. If the value of Condition (9) is less than its lower limit, aberrations can be corrected properly, but simultaneously the total length of the taking lens system needs to be made unduly long. An unduly long total length demands an unduly large diameter in the front lens unit, and thus makes the taking lens system as a whole unduly large. In contrast, if the value of Condition (9) is greater than its upper limit, the total length of the taking lens system is successfully minimized, but simultaneously aberrations (in particular, distortion and curvature of field) become unduly large.

In a case where the negative lens element (FL1) of the front lens unit (F) is, at least on one side thereof, provided with an aspherical surface whose maximum effective radius is represented by ymax, it is preferable that Condition (10) below be fulfilled for a height y in a direction perpendicular to the optical axis in the range 0.7ymax<y<1.0ymax. In a case where the positive image-side-end lens element (RL2) of the rear lens unit (R) is, at least on one side thereof, provided with an aspherical surface whose maximum effective radius is represented by ymax, it is preferable that Condition (10) below be fulfilled for a height y in a direction perpendicular to the optical axis in the range 0.7ymax<y<1.0ymax. It is more preferable that both of the negative and positive lens elements (FL1 and RL2) be, at least on one side thereof, provided with an aspherical surface that fulfills Condition (10) below. Here, x and x0, which represent the surface shape of the aspherical surface and the reference spherical surface, respectively, are defined specifically by Formulae (AS) and (RE) noted earlier, respectively, relative to the vertex.

$$0.01 \leq (x-x0)/(N'-N) \leq 2.0 \quad (10)$$

where x represents the deviation (mm) of the aspherical surface along the optical axis (AX) at the height in a direction perpendicular to the optical axis (AX) (the direction pointing to the object side is negative);

x0 represents the deviation (mm) of the reference spherical surface of the aspherical surface along the optical axis (AX) at the height in a direction perpendicular to the optical axis (AX) (the direction pointing to the object side is negative);

N represents the refractive index of the object-side medium of the aspherical surface for the d line; and N' represents the refractive index of the image-side medium of the aspherical surface for the d line.

Condition (10) defines the condition to be fulfilled, in particular, to correct distortion and curvature of field. If the value of Condition (10) is less than its lower limit, positive distortion increases, and simultaneously the inclination of the image plane toward the over side becomes unduly large. In contrast, if the value of Condition (10) is greater than its upper limit, negative distortion increases, and simultaneously the inclination of the image plane toward the under side becomes unduly large. This makes it impossible to realize a satisfactorily practical taking lens system. Note that, in a taking lens system that includes, as in the tenth embodiment, a plurality of aspherical surfaces, at least one of those aspherical surfaces needs to fulfill Condition (10) above; that is, the other aspherical surfaces do not necessarily have to fulfill Condition (10) above, if that is advantageous for the correction of other aberrations.

It is preferable that the doublet lens element (RL1) provided in the rear lens unit (R) fulfill Condition (11) below.

$$-0.05 \leq f/fS \leq 0.25 \quad (11)$$

where fS represents the focal length of the doublet lens element (RL1) provided in the rear lens unit (R).

Condition (11) defines the condition to be fulfilled, in particular, to strike a proper balance between the total length and the aberration characteristics. If the value of Condition (11) is less than its lower limit, aberrations can be corrected properly, but simultaneously the total length of the taking lens system needs to be made unduly long. An unduly long total length demands an unduly large diameter in the front lens unit, and thus makes the taking lens system as a whole unduly large. In contrast, if the value of Condition (11) is greater than its upper limit, the total length of the taking lens system is successfully minimized, but simultaneously aberrations (in particular, distortion and curvature of field) become unduly large.

It is preferable that the positive lens element (RL2) disposed at the image-side end of the rear lens unit (R) fulfill Condition (12) below.

$$0.23 \leq f/fP \leq 0.99 \quad (12)$$

where fp represents the focal length of the positive lens element (RL2) disposed at the image-side end of the rear lens unit (R).

Condition (12) defines the condition to be fulfilled, in particular, to achieve well-balanced correction of coma aberration. If the value of Condition (12) is less than its lower limit, coma aberration becomes so large as to have unduly adverse effects on high-order lateral chromatic aberration. In contrast, if the value of Condition (12) is greater than its upper limit, coma aberration becomes so large as to have unduly adverse effects on astigmatism.

It is preferable that Condition (13) below be fulfilled.

$$1 \leq img \times R \leq 15 \tag{13}$$

where img represents the maximum image height; and

R represents the effective diameter of the image-side-end surface.

Condition (13) defines the condition to be fulfilled to keep appropriate the size and the aberration characteristics of a taking lens system as well as the conditions expected to be fulfilled thereby when designed for use in a video camera. Usually, a solid-state imaging device (such as a CCD) designed for use in a video camera has microlenses disposed on the front surfaces of the individual light-sensing elements provided therein so as to enhance its light-sensing efficiency. To make efficient use of the light-condensing ability of those microlenses, it is essential to let rays enter the microlenses substantially parallel to their optical axes (i.e. substantially perpendicular to the light-sensing surface of the individual light-sensing elements). To achieve this, it is necessary to make the entire taking lens system substantially telecentric toward the image side. If the value of Condition (13) is greater than its upper limit, the entire taking lens system is too telecentric, and thus negative distortion becomes unduly large, and simultaneously the inclination of the image plane toward the under side becomes unduly large. In contrast, if the value of Condition (13) is less than its lower limit, it is difficult to make the entire taking lens system substantially telecentric. Even if the entire taking lens system can be made substantially telecentric, the back focal distance is then unduly long and thus the taking lens system as a whole is unduly large.

EXAMPLES

Hereinafter, examples of the taking lens systems embodying the present invention will be presented with reference to their construction data, graphic representations of aberrations, and other data. Tables 1 to 11 list the construction data of Examples 1 to 11, which respectively correspond to the first to eleventh embodiments described above. FIGS. 1 to 3 and 7 to 14, which show the lens arrangement of the taking lens systems of the first to eleventh embodiments, respectively, illustrate the lens arrangement of Examples 1 to 11, respectively.

In the construction data of each example, ri (i=1, 2, 3, . . . ) represents the radius of curvature of the ith surface counted from the object side, di (i=1, 2, 3, . . . ) represents the ith axial distance counted from the object side, and Ni (i=1, 2, 3, . . . ) and vi (i=1, 2, 3, . . . ) respectively represent the refractive index (Nd) for the d line and the Abbe number (vd) of the ith optical element counted from the object side. Also listed are the focal length f and the F-number Fn0 of the entire taking lens system. Table 12 lists the values corresponding to Conditions (1), (1=), (2) to (5), and (7) noted above as observed in Examples 1 to 3; and Table 13 lists the values corresponding to Conditions (8), (8=), (9), and (11) to (13) noted above as observed in Examples 4 to 11. A surface whose radius of curvature ri is marked with an asterisk (*) is an aspherical surface (which does not necessarily have to be a refractive optical surface having an aspherical shape but may be a surface exerting a refracting effect equivalent to an aspherical surface), whose surface shape is defined by Formula (AS) noted earlier. Also listed together are the data of the aspherical surfaces and the values corresponding to Conditions (6) and (10) that define the conditions to be fulfilled by the aspherical surface (note that ymax represents the maximum height of an aspherical surface in a direction perpendicular to its optical axis (AX) (i.e. the maximum effective radius)).

FIGS. 4A to 4C, 5A to 5C, and 6A to 6C are graphic representations of the aberrations observed in Examples 1 to 3, respectively; and FIGS. 15A to 15C, 16A to 16C, 17A to 17C, 18A to 18C, 9A to 19C, 20A to 20C, 21A to 21C, and 22 to 22C are graphic representations of the aberrations observed in Examples 4 to 11, respectively. Of these diagrams, FIGS. 4A to 6A and 15A to 22A show spherical aberration and sine condition; FIGS. 4B to 6B and 15B to 22B show astigmatism; and FIGS. 4C to 6C and 15C to 22C show distortion (Y=: the maximum image height). In these diagrams, the solid line (d) represents the aberration for the d line, the dash-and-dot line (g) represents the aberration for the g line, the dash-dot-dot line (c) represents the aberration for the c line, and the broken line (SC) represents the sine condition. Moreover, the broken line (DM) represents the astigmatism on the meridional plane, and the solid line (DS) represents the astigmatism on the sagittal plane.

TABLE 1

Construction Data of Example 1
f = 6.00
FNO = 2.87

| Radius of Curvature | Axial Distance | Refractive Index | Abbe Number |
|---|---|---|---|
| r1 = 6.667 | | | |
| | d1 = 2.095 | N1 = 1.84666 | v1 = 23.82 |
| r2 = 7.636 | | | |
| | d2 = 0.100 | | |
| r3* = 5.781 | | | |
| | d3 = 1.000 | N2 = 1.52510 | v2 = 56.38 |
| r4* = 2.440 | | | |
| | d4 = 3.696 | | |
| r5 = ∞(A) | | | |
| | d5 = 1.089 | | |
| r6 = −12.819 | | | |
| | d6 = 0.750 | N3 = 1.79850 | v3 = 22.60 |
| r7 = 7.663 | | | |
| | d7 = 3.435 | N4 = 1.77250 | v4 = 49.77 |
| r8 = −5.750 | | | |
| | d8 = 0.763 | | |
| r9* = 5.439 | | | |
| | d9 = 3.498 | N5 = 1.52510 | v5 = 56.38 |
| r10* = 30.968 | | | |
| | d10 = 1.164 | | |
| r11 = ∞ | | | |
| | d11 = 3.400 | N6 = 1.51680 | v6 = 64.20 |
| r12 = ∞ | | | |

[Aspherical Surface Data of Third Surface (r3)]

ε = 1.0000
A4 = 0.29534 × 10$^{-2}$
A6 = −0.14479 × 10$^{-3}$
A8 = 0.51131 × 10$^{-5}$

[Aspherical Surface Data of Fourth Surface (r4)]

ε = 1.0000
A4 = 0.44462 × 10$^{-2}$
A6 = 0.23604 × 10$^{-5}$
A8 = −0.16909 × 10$^{-5}$

TABLE 1-continued

[Aspherical Surface Data of Ninth Surface (r9)]

$\epsilon$ = 1.0000
A4 = 0.59406 × $10^{-3}$
A6 = 0.43131 × $10^{-4}$
A8 = −0.36203 × $10^{-5}$
A10 = 0.24261 × $10^{-6}$

[Aspherical Surface Data of Tenth Surface (r10)]

$\epsilon$ = 1.0000
A4 = 0.32149 × $10^{-2}$
A6 = −0.92707 × $10^{-4}$
A8 = 0.56750 × $10^{-4}$
A10 = −0.75308H$10^{-5}$
A12 = 0.44164 × $10^{-6}$

[Values of Condition (6) on Third Surface (r3)]

y = 0.00 ymax . . . (x-x0)/(N'-N) = 0.00000
y = 0.20 ymax . . . (x-x0)/(N'-N) = 0.00067
y = 0.40 ymax . . . (x-x0)/(N'-N) = 0.01020
y = 0.60 ymax . . . (x-x0)/(N'-N) = 0.04767
y = 0.80 ymax . . . (x-x0)/(N'-N) = 0.13621
y = 1.00 ymax . . . (x-x0)/(N'-N) = 0.30009

[Values of Condition (6) on Fourth Surface (r4)]

y = 0.00 ymax . . . (x-x0)/(N'-N) = 0.00000
y = 0.20 ymax . . . (x-x0)/(N'-N) = −0.00022
y = 0.40 ymax . . . (x-x0)/(N'-N) = −0.00347
y = 0.60 ymax . . . (x-x0)/(N'-N) = −0.01756
y = 0.80 ymax . . . (x-x0)/(N'-N) = −0.05543
y = 1.00 ymax . . . (x-x0)/(N'-N) = −0.13494

[Values of Condition (6) on Ninth Surface (r9)]

y = 0.00 ymax . . . (x-x0)/(N'-N) = 0.00000
y = 0.20 ymax . . . (x-x0)/(N'-N) = 0.00044
y = 0.40 ymax . . . (x-x0)/(N'-N) = 0.00768
y = 0.60 ymax . . . (x-x0)/(N'-N) = 0.04348
y = 0.80 ymax . . . (x-x0)/(N'-N) = 0.16145
y = 1.00 ymax . . . (x-x0)/(N'-N) = 0.55787

[Values of Condition (6) on Tenth Surface (r10)]

y = 0.00 ymax . . . (x-x0)/(N'-N) = 0.00000
y = 0.20 ymax . . . (x-x0)/(N'-N) = −0.00096
y = 0.40 ymax . . . (x-x0)/(N'-N) = −0.01528
y = 0.60 ymax . . . (x-x0)/(N'-N) = −0.08108
y = 0.80 ymax . . . (x-x0)/(N'-N) = −0.28450
y = 1.00 ymax . . . (x-x0)/(N'-N) = −0.90118

TABLE 2

Construction Data of Example 2
f = 4.45
FNO = 2.87

| Radius of Curvature | Axial Distance | Refractive Index | Abbe Number |
|---|---|---|---|
| r1 = 7.686 | | | |
| | d1 = 3.626 | N1 = 1.84666 | ν1 = 23.82 |
| r2 = 6.424 | | | |
| | d2 = 0.981 | | |
| r3* = 11.553 | | | |
| | d3 = 1.000 | N2 = 1.52510 | ν2 = 56.38 |
| r4* = 2.905 | | | |
| | d4 = 6.624 | | |
| r5 = ∞(A) | | | |
| | d5 = 1.000 | | |
| r6 = 24.958 | | | |
| | d6 = 0.750 | N3 = 1.79850 | ν3 = 22.60 |
| r7 = 5.195 | | | |
| | d7 = 3.108 | N4 = 1.77250 | ν4 = 49.77 |
| r8 = −8.873 | | | |
| | d8 = 1.211 | | |
| r9* = 6.159 | | | |
| | d9 = 2.516 | N5 = 1.52510 | ν5 = 56.38 |

TABLE 2-continued

| | | | |
|---|---|---|---|
| r10* = −37.132 | | | |
| | d10 = 0.784 | | |
| r11 = ∞ | | | |
| | d11 = 3.400 | N6 = 1.51680 | ν6 = 64.20 |
| r12 = ∞ | | | |

[Aspherical Surface Data of Third Surface (r3)]

$\epsilon$ = 1.0000
A4 = 0.43603 × $10^{-2}$
A6 = −0.17532 × $10^{-3}$
A8 = 0.28610 × $10^{-5}$

[Aspherical Surface Data of Fourth Surface (r4)]

$\epsilon$ = 1.0000
A4 = 0.55611 × $10^{-2}$
A6 = 0.40608 × $10^{-3}$
A8 = −0.27235 × $10^{-4}$

[Aspherical Surface Data of Ninth Surface (r9)]

$\epsilon$ = 1.0000
A4 = 0.15732 × $10^{-3}$
A6 = 0.16687 × $10^{-3}$
A8 = −0.13340 × $10^{-4}$
A10 = 0.89463 × $10^{-6}$

[Aspherical Surface Data of Tenth Surface (r10)]

$\epsilon$ = 1.0000
A4 = 0.22715 × $10^{-2}$
A6 = −0.26768 × $10^{-4}$
A8 = 0.59965 × $10^{-4}$
A10 = −0.91076 × $10^{-5}$
A12 = 0.55344 × $10^{-6}$

[Values of Condition (6) on Third Surface (r3)]

y = 0.00 ymax . . . (x-x0)/(N'-N) = 0.00000
y = 0.20 ymax . . . (x-x0)/(N'-N) = 0.00679
y = 0.40 ymax . . . (x-x0)/(N'-N) = 0.09712
y = 0.60 ymax . . . (x-x0)/(N'-N) = 0.40653
y = 0.80 ymax . . . (x-x0)/(N'-N) = 0.99259
y = 1.00 ymax . . . (x-x0)/(N'-N) = 1.85966

[Values of Condition (6) on Fourth Surface (r4)]

y = 0.00 ymax . . . (x-x0)/(N'-N) = 0.00000
y = 0.20 ymax . . . (x-x0)/(N'-N) = −0.00111
y = 0.40 ymax . . . (x-x0)/(N'-N) = −0.01888
y = 0.60 ymax . . . (x-x0)/(N'-N) = −0.10299
y = 0.80 ymax . . . (x-x0)/(N'-N) = −0.34658
y = 1.00 ymax . . . (x-x0)/(N'-N) = −0.86318

[Values of Condition (6) on Ninth Surface (r9)]

y = 0.00 ymax . . . (x-x0)/(N'-N) = 0.00000
y = 0.20 ymax . . . (x-x0)/(N'-N) = 0.00011
y = 0.40 ymax . . . (x-x0)/(N'-N) = 0.00331
y = 0.60 ymax . . . (x-x0)/(N'-N) = 0.02711
y = 0.80 ymax . . . (x-x0)/(N'-N) = 0.13027
y = 1.00 ymax . . . (x-x0)/(N'-N) = 0.54926

[Values of Condition (6) on Tenth Surface (r10)]

y = 0.00 ymax . . . (x-x0)/(N'-N) = 0.00000
y = 0.20 ymax . . . (x-x0)/(N'-N) = −0.00068
y = 0.40 ymax . . . (x-x0)/(N'-N) = −0.01127
y = 0.60 ymax . . . (x-x0)/(N'-N) = −0.06357
y = 0.80 ymax . . . (x-x0)/(N'-N) = −0.23711
y = 1.00 ymax . . . (x-x0)/(N'-N) = −0.82071

TABLE 3

Construction Data of Example 3
f = 5.17
FNO = 2.87

| Radius of Curvature | Axial Distance = | Refractive Index = | Abbe Number |
|---|---|---|---|
| r1 = 6.531 | | | |
| | d1 = 2.678 | N1 = 1.84666 | ν1 = 23.82 |
| r2 = 6.173 | | | |
| | d2 = 0.121 | | |
| r3* = 7.730 | | | |
| | d3 = 1.000 | N2 = 1.52510 = | ν2 = 56.38 |
| r4* = 2.587 | | | |
| | d4 = 4.829 | | |
| r5 = ∞(A) | | | |
| | d5 = 1.013 | | |
| r6 = −89.469 | | | |
| | d6 = 0.750 | N3 = 1.79850 | ν3 = 22.60 |
| r7 = 6.019 | | | |
| | d7 = 3.302 | N4 = 1.77250 | ν4 = 49.77 |
| r8 = −6.659 | | | |
| | d8 = 1.017 | | |
| r9* = 5.852 | | | |
| | d9 = 2.872 | N5 = 1.52510 | ν5 = 56.38 |
| r10* = 250.706 | | | |
| | d10 = 1.017 | | |
| r11 = ∞ | | | |
| | d11 = 3.400 | N6 = 1.51680 | ν6 = 64.20 |
| r12 = ∞ | | | |

[Aspherical Surface Data of Third Surface (r3)]

$\epsilon$ = 1.0000
A4 = 0.49248 × $10^{-2}$
A6 = −0.22014 × $10^{-3}$
A8 = 0.40538 × $10^{-5}$
[Aspherical Surface Data of Fourth Surface (r4)]

$\epsilon$ = 1.0000
A4 = 0.70371 × $10^{-2}$
A6 = 0.45354 × $10^{-3}$
A8 = −0.32645 × $10^{-4}$
[Aspherical Surface Data of Ninth Surface (r9)]

$\epsilon$ = 1.0000
A4 = 0.68906 × $10^{-2}$
A6 = 0.99755 × $10^{-4}$
A8 = −0.90280 × $10^{-5}$
A10 = 0.55126 × $10^{-6}$
[Aspherical Surface Data of Tenth Surface (r10)]

$\epsilon$ = 1.0000
A4 = 0.31522 × $10^{-2}$
A6 = −0.54614 × $10^{-4}$
A8 = 0.52142 × $10^{-4}$
A10 = −0.76446 × $10^{-5}$
A12 = 0.45022 × $10^{-6}$
[Values of Condition (6) on Third Surface (r3)]

y = 0.00 ymax . . . (x−x0)/(N'−N) = 0.00000
y = 0.20 ymax . . . (x−x0)/(N'−N) = 0.00246
y = 0.40 ymax . . . (x−x0)/(N'−N) = 0.03673
y = 0.60 ymax . . . (x−x0)/(N'−N) = 0.16524
y = 0.80 ymax . . . (x−x0)/(N'−N) = 0.44254
y = 1.00 ymax . . . (x−x0)/(N'−N) = 0.88047
[Values of Condition (6) on Fourth Surface (r4)]

y = 0.00 ymax . . . (x−x0)/(N'−N) = 0.00000
y = 0.20 ymax . . . (x−x0)/(N'−N) = −0.00061
y = 0.40 ymax . . . (x−x0)/(N'−N) = −0.01009
y = 0.60 ymax . . . (x−x0)/(N'−N) = −0.05375
y = 0.80 ymax . . . (x−x0)/(N'−N) = −0.17896
y = 1.00 ymax . . . (x−x0)/(N'−N) = −0.45420
[Values of Condition (6) on Ninth Surface (r9)]

y = 0.00 ymax . . . (x−x0)/(N'−N) = 0.00000
y = 0.20 ymax . . . (x−x0)/(N'−N) = 0.00041
y = 0.40 ymax . . . (x−x0)/(N'−N) = 0.00767

TABLE 3-continued y = 0.60 ymax . . . (x−x0)/(N'−N) = 0.04582
y = 0.80 ymax . . . (x−x0)/(N'−N) = 0.17423
y = 1.00 ymax . . . (x−x0)/(N'−N) = 0.60177
[Values of Condition (6) on Tenth Surface (r10)]

y = 0.00 ymax . . . (x−x0)/(N'−N) = 0.00000
y = 0.20 ymax . . . (x−x0)/(N'−N) = −0.00094
y = 0.40 ymax . . . (x−x0)/(N'−N) = −0.01521
y = 0.60 ymax . . . (x−x0)/(N'−N) = −0.08134
y = 0.80 ymax . . . (x−x0)/(N'−N) = −0.28282
y = 1.00 ymax . . . (x−x0)/(N'−N) = −0.86998

TABLE 4

Construction Data of Example 4
f = 5.55
FNO = 2.87

| Radius of Curvature | Axial Distance | Refractive Index | Abbe Number |
|---|---|---|---|
| r1 = −70.857 | | | |
| | d1 = 1.000 | N1 = 1.52510 | ν1 = 56.38 |
| r2* = 3.302 | | | |
| | d2 = 2.510 | | |
| r3 = 7.737 | | | |
| | d3 = 1.925 | N2 = 1.85000 | ν2 = 40.04 |
| r4 = −15.335 | | | |
| | d4 = 2.393 | | |
| r5 = ∞(A) | | | |
| | d5 = 1.243 | | |
| r6 = −5.496 | | | |
| | d6 = 0.750 | N3 = 1.79850 | ν3 = 22.60 |
| r7 = 11.968 | | | |
| | d7 = 3.132 | N4 = 1.77250 | ν4 = 49.77 |
| r8 = −6.447 | | | |
| | d8 = 0.100 | | |
| r9* = 9.647 | | | |
| | d9 = 1.976 | N5 = 1.52510 | ν5 = 56.38 |
| r10 = −16.176 | | | |
| | d10 = 1.339 | | |
| r11 = ∞ | | | |
| | d11 = 3.400 | N6 = 1.51680 | ν6 = 64.20 |
| r12 = ∞ | | | |

[Aspherical Surface Data of Second Surface (r2)]

$\epsilon$ = 1.0000
A4 = −0.21160 × $10^{-2}$
A6 = −0.68934 × $10^{-4}$
A8 = −0.21582 × $10^{-4}$
[Aspherical Surface Data of Ninth Surface (r9)]

$\epsilon$ = 1.0000
A4 = −0.89304 × $10^{-3}$
A6 = 0.11368 × $10^{-4}$
A8 = −0.78938 × $10^{-6}$
[Values of Condition (10) on Second Surface (r2)]

y = 0.00 ymax . . . (x−x0)/(N'−N) = 0.00000
y = 0.20 ymax . . . (x−x0)/(N'−N) = 0.00022
y = 0.40 ymax . . . (x−x0)/(N'−N) = 0.00362
y = 0.60 ymax . . . (x−x0)/(N'−N) = 0.01960
y = 0.80 ymax . . . (x−x0)/(N'−N) = 0.07027
y = 1.00 ymax . . . (x−x0)/(N'−N) = 0.20843
[Values of Condition (10) on Ninth Surface (r9)]

y = 0.00 ymax . . . (x−x0)/(N'−N) = 0.00000
y = 0.20 ymax . . . (x−x0)/(N'−N) = −0.00027
y = 0.40 ymax . . . (x−x0)/(N'−N) = −0.00426
y = 0.60 ymax . . . (x−x0)/(N'−N) = −0.02122
y = 0.80 ymax . . . (x−x0)/(N'−N) = −0.06632
y = 1.00 ymax . . . (x−x0)/(N'−N) = −0.16297

TABLE 5

Construction Data of Example 5
f = 5.08
FNO = 2.87

| Radius of Curvature | Axial Distance | Refractive Index | Abbe Number |
|---|---|---|---|
| r1* = −39.997 | | | |
| | d1 = 1.732 | N1 = 1.52510 | ν1 = 56.38 |
| r2* = 3.628 | | | |
| | d2 = 3.104 | | |
| r3 = 7.864 | | | |
| | d3 = 2.111 | N2 = 1.85000 | ν2 = 40.04 |
| r4 = −19.144 | | | |
| | d4 = 2.661 | | |
| r5 = ∞(A) | | | |
| | d5 = 1.199 | | |
| r6 = −6.265 | | | |
| | d6 = 0.750 | N3 = 1.79850 | ν3 = 22.60 |
| r7 = 0.028 | | | |
| | d7 = 3.138 | N4 = 1.77250 | ν4 = 49.77 |
| r8 = −6.424 | | | |
| | d8 = 0.317 | | |
| r9* = 6.400 | | | |
| | d9 = 1.981 | N5 = 1.52510 | ν5 = 56.38 |
| r10 = 1633.346 | | | |
| | d10 = 1.607 | | |
| r11 = ∞ | | | |
| | d11 = 3.400 | N6 = 1.51680 | ν6 = 64.20 |
| r12 = ∞ | | | |

[Aspherical Surface Data of First Surface (r1)]

$\epsilon = 1.0000$
$A4 = 0.12670 \times 10^{-2}$
$A6 = -0.52617 \times 10^{-4}$
$A8 = 0.97357 \times 10^{-6}$

[Aspherical Surface Data of Second Surface (r2)]

$\epsilon = 1.0000$
$A4 = 0.30439 \times 10^{-3}$
$A6 = -0.55298 \times 10^{-5}$
$A8 = -0.16566 \times 10^{-4}$

[Aspherical Surface Data of Ninth Surface (r9)]

$\epsilon = 1.0000$
$A4 = -0.10163 \times 10^{-2}$
$A6 = 0.15447 \times 10^{-4}$
$A8 = -0.14079 \times 10^{-5}$

[Values of Condition (10) on First Surface (r1)]

y = 0.00 ymax ... (x-x0)/(N'-N) = 0.00000
y = 0.20 ymax ... (x-x0)/(N'-N) = 0.00106
y = 0.40 ymax ... (x-x0)/(N'-N) = 0.01560
y = 0.60 ymax ... (x-x0)/(N'-N) = 0.06865
y = 0.80 ymax ... (x-x0)/(N'-N) = 0.17929
y = 1.00 ymax ... (x-x0)/(N'-N) = 0.35391

[Values of Condition (10) on Second Surface (r2)]

y = 0.00 ymax ... (x-x0)/(N'-N) = 0.00000
y = 0.20 ymax ... (x-x0)/(N'-N) = −0.00006
y = 0.40 ymax ... (x-x0)/(N'-N) = −0.00083
y = 0.60 ymax ... (x-x0)/(N'-N) = −0.00238
y = 0.80 ymax ... (x-x0)/(N'-N) = 0.00754
y = 1.00 ymax ... (x-x0)/(N'-N) = 0.09481

[Values of Condition (10) on Ninth Surface (r9)]

y = 0.00 ymax ... (x-x0)/(N'-N) = 0.00000
y = 0.20 ymax ... (x-x0)/(N'-N) = −0.00037
y = 0.40 ymax ... (x-x0)/(N'-N) = −0.00575
y = 0.60 ymax ... (x-x0)/(N'-N) = −0.02861
y = 0.80 ymax ... (x-x0)/(N'-N) = −0.09038
y = 1.00 ymax ... (x-x0)/(N'-N) = −0.22924

TABLE 6

Construction Data of Example 6
f = 4.75
FNO = 2.87

| Radius of Curvature | Axial Distance | Refractive Index | Abbe Number |
|---|---|---|---|
| r1* = −60.794 | | | |
| | d1 = 1.559 | N1 = 1.52510 | ν1 = 56.38 |
| r2* = 3.544 | | | |
| | d2 = 4.348 | | |
| r3 = 8.536 | | | |
| | d3 = 2.048 | N2 = 1.85000 | ν2 = 40.04 |
| r4 = −19.714 | | | |
| | d4 = 2.870 | | |
| r5 = ∞(A) | | | |
| | d5 = 1.172 | | |
| r6 = −7.595 | | | |
| | d6 = 0.750 | N3 = 1.79850 | ν3 = 22.60 |
| r7 = 7.749 | | | |
| | d7 = 3.104 | N4 = 1.77250 | ν4 = 49.77 |
| r8 = −7.279 | | | |
| | d8 = 0.725 | | |
| r9* = 5.330 | | | |
| | d9 = 2.033 | N5 = 1.52510 | ν5 = 56.38 |
| r10* = 25.028 | | | |
| | d10 = 0.990 | | |
| r11 = ∞ | | | |
| | d11 = 3.400 | N6 = 1.51680 | ν6 = 64.20 |
| r12 ∞ | | | |

[Aspherical Surface Data of First Surface (r1)]

$\epsilon = 1.0000$
$A4 = 0.17350 \times 10^{-2}$
$A6 = -0.73617 \times 10^{-4}$
$A8 = 0.13305 \times 10^{-5}$

[Aspherical Surface Data of Second Surface (r2)]

$\epsilon = 1.0000$
$A4 = 0.86937 \times 10^{-3}$
$A6 = 0.43329 \times 10^{-4}$
$A8 = -0.23618 \times 10^{-4}$

[Aspherical Surface Data of Ninth Surface (r9)]

$\epsilon = 1.0000$
$A4 = -0.11375 \times 10^{-2}$
$A6 = 0.12458 \times 10^{-5}$
$A8 = -0.12147 \times 10^{-5}$

[Values of Condition (1O) on First Surface (r1)]

y = 0.00 ymax ... (x-x0)/(N'-N) = 0.00000
y = 0.20 ymax ... (x-x0)/(N'-N) = 0.00234
y = 0.40 ymax ... (x-x0)/(N'-N) = 0.03357
y = 0.60 ymax ... (x-x0)/(N'-N) = 0.14134
y = 0.80 ymax ... (x-x0)/(N'-N) = 0.34967
y = 1.00 ymax ... (x-x0)/(N'-N) = 0.67241

[Values of Condition (10) on Second Surface (r2)]

y = 0.00 ymax ... (x-x0)/(N'-N) = 0.00000
y = 0.20 ymax ... (x-x0)/(N'-N) = −0.00024
y = 0.40 ymax ... (x-x0)/(N'-N) = −0.00386
y = 0.60 ymax ... (x-x0)/(N'-N) = −0.01648
y = 0.80 ymax ... (x-x0)/(N'-N) = −0.01838
y = 1.00 ymax ... (x-x0)/(N'-N) = 0.14482

[Values of Condition (10) on Ninth Surface (r9)]

y = 0.00 ymax ... (x-x0)/(N'-N) = 0.00000
y = 0.20 ymax ... (x-x0)/(N'-N) −0.00047
y = 0.40 ymax ... (x-x0)/(N'-N) = −0.00751
y = 0.60 ymax ... (x-x0)/(N'-N) = −0.03850
y = 0.80 ymax ... (x-x0)/(N'-N) = −0.12609
y = 1.00 ymax ... (x-x0)/(N'-N) = −0.33147

TABLE 7

Construction Data of Example 7 f = 4.45
FNO = 2.87

| Radius of Curvature | Axial Distance | Refractive Index | Abbe Number |
|---|---|---|---|
| r1* = −69.893 | | | |
| | d1 = 1.685 | N1 = 1.52510 | ν1 = 56.38 |
| r2* = 3.198 | | | |
| | d2 = 4.545 | | |
| r3 = 10.683 | | | |
| | d3 = 3.339 | N2 = 1.85000 | ν2 = 40.04 |
| r4 = −11.888 | | | |
| | d4 = 1.796 | | |
| r5 = ∞(A) | | | |
| | d5 = 1.738 | | |
| r6 = −9.557 | | | |
| | d6 = 0.750 | N3 = 1.79850 | ν3 = 22.60 |
| r7 = 6.619 | | | |
| | d7 = 3.155 | N4 = 1.77250 | ν4 = 49.77 |
| r8 = −8.758 | | | |
| | d8 = 0.429 | | |
| r9* = 7.171 | | | |
| | d9 = 1.915 | N5 = 1.52510 | ν5 = 56.38 |
| r10 = −93.076 | | | |
| | d10 = 0.563 | | |
| r11 = ∞ | | | |
| | d11 = 3.400 | N6 = 1.51680 | ν6 = 64.20 |
| r12 = ∞ | | | |

[Aspherical Surface Data of First Surface (r1)]

ε = 1.0000
A4 = 0.18944 × $10^{-2}$
A6 = −0.91951 × $10^{-4}$
A8 = 0.18571 × $10^{-5}$

[Aspherical Surface Data of Second Surface (r2)]

ε = 1.0000
A4 = 0.84518 × $10^{-3}$
A6 = 0.82034 × $10^{-4}$
A8 = −0.46802 × $10^{-4}$

[Aspherical Surface Data of Ninth Surface (r9)]

ε = 1.0000
A4 = −0.95746 × $10^{-3}$
A6 = 0.20191 × $10^{-5}$
A8 = −0.77487 × $10^{-6}$

[Values of Condition (10) on First Surface (r1)]

y = 0.00ymax ... (x-x0)/(N'-N) = 0.00000
y = 0.20ymax ... (x-x0)/(N'-N) = 0.00199
y = 0.40ymax ... (x-x0)/(N'-N) = 0.02851
y = 0.60ymax ... (x-x0)/(N'-N) = 0.11967
y = 0.80ymax ... (x-x0)/(N'-N) = 0.29415
y = 1.00ymax ... (x-x0)/(N'-N) = 0.55871

[Values of Condition (10) on Second Surface (r2)]

y = 0.00ymax ... (x-x0)/(N'-N) = 0.00000
y = 0.20ymax ... (x-x0)/(N'-N) = −0.00016
y = 0.40ymax ... (x-x0)/(N'-N) = −0.00255
y = 0.60ymax ... (x-x0)/(N'-N) = −0.01048
y = 0.80ymax ... (x-x0)/(N'-N) = −0.00494
y = 1.00ymax ... (x-x0)/(N'-N) = 0.14971

[Values of Condition (10) on Ninth Surface (r9)]

y = 0.00ymax ... (x-x0)/(N'-N) = 0.00000
y = 0.20ymax ... (x-x0)/(N'-N) = −0.00031
y = 0.40ymax ... (x-x0)/(N'-N) = −0.00489
y = 0.60ymax ... (x-x0)/(N'-N) = −0.02486
y = 0.80ymax ... (x-x0)/(N'-N) = −0.07995
y = 1.00ymax ... (x-x0)/(N'-N) = −0.20329

TABLE 8

Construction Data of Example 8 f = 5.55
FNO = 2.87

| Radius of Curvature | Axial Distance | Refractive Index | Abbe Number |
|---|---|---|---|
| r1 = −14.041 | | | |
| | d1 = 1.000 | N1 = 1.52510 | ν1 = 56.38 |
| r2* = 3.248 | | | |
| | d2 = 2.191 | | |
| r3 = 11.415 | | | |
| | d3 = 1.798 | N2 = 1.85000 | ν2 = 40.04 |
| r4 = −13.010 | | | |
| | d4 = 2.703 | | |
| r5 = ∞(A) | | | |
| | d5 = 1.000 | | |
| r6 = 6.844 | | | |
| | d6 = 2.529 | N3 = 1.77250 | ν3 = 49.77 |
| r7 = −8.719 | | | |
| | d7 = 0.750 | N4 = 1.75000 | ν4 = 25.14 |
| r8 = 5.135 | | | |
| | d8 = 1.715 | | |
| r9* = 6.722 | | | |
| | d9 = 2.597 | N5 = 1.52510 | ν5 = 56.38 |
| r10* = −6.717 | | | |
| | d10 = 0.919 | | |
| r11 = ∞ | | | |
| | d11 = 3.400 | N6 = 1.51680 | ν6 = 64.20 |
| r12 = ∞ | | | |

[Aspherical Surface Data of Second Surface (r2)]

ε = 1.0000
A4 = −0.38963 × $10^{-2}$
A6 = −0.98085 × $10^{-4}$
A8 = −0.26318 × $10^{-4}$

[Aspherical Surface Data of Ninth Surface (r9)]

ε = 1.0000
A4 = −0.22552 × $10^{-3}$
A6 = 0.72085 × $10^{-4}$
A8 = 0.68284 × $10^{-6}$

[Aspherical Surface Data of Tenth Surface (r10)]

ε = 1.0000
A4 = 0.21821 × $10^{-2}$
A6 = 0.10796 × $10^{-4}$
A8 = 0.72248 × $10^{-5}$

[Values of Condition (10) on Second Surface (r2)]

y = 0.00ymax ... (x-x0)/(N'-N) = 0.00000
y = 0.20ymax ... (x-x0)/(N'-N) = 0.00023
y = 0.40ymax ... (x-x0)/(N'-N) = 0.00377
y = 0.60ymax ... (x-x0)/(N'-N) = 0.01977
y = 0.80ymax ... (x-x0)/(N'-N) = 0.06649
y = 1.00ymax ... (x-x0)/(N'-N) = 0.17928

[Values of Condition (10) on Ninth Surface (r9)]

y = 0.00ymax ... (x-x0)/(N'-N) = 0.00000
y = 0.20ymax ... (x-x0)/(N'-N) = −0.00006
y = 0.40ymax ... (x-x0)/(N'-N) = −0.00055
y = 0.60ymax ... (x-x0)/(N'-N) = 0.00154
y = 0.80ymax ... (x-x0)/(N'-N) = 0.02489
y = 1.00ymax ... (x-x0)/(N'-N) = 0.12727

[Values of Condition (10) on Tenth Surface (r10)]

y = 0.00ymax ... (x-x0)/(N'-N) = 0.00000
y = 0.20ymax ... (x-x0)/(N'-N) = −0.00075
y = 0.40ymax ... (x-x0)/(N'-N) = −0.01223
y = 0.60ymax ... (x-x0)/(N'-N) = −0.06493
y = 0.80ymax ... (x-x0)/(N'-N) = −0.22816
y = 1.00ymax ... (x-x0)/(N'-N) = −0.66954

TABLE 9

Construction Data of Example 9 f = 5.08
FNO = 2.87

| Radius of Curvature | Axial Distance | Refractive Index | Abbe Number |
|---|---|---|---|
| r1 = −19.703 | | | |
| | d1 = 1.000 | N1 = 1.52510 | ν1 = 56.38 |
| r2* = 3.283 | | | |
| | d2 = 3.321 | | |
| r3 = 13.385 | | | |
| | d3 = 1.770 | N2 = 1.85000 | ν2 = 40.04 |
| r4 = −12.871 | | | |
| | d4 = 2.615 | | |
| r5 = ∞(A) | | | |
| | d5 = 1.000 | | |
| r6 = 7.317 | | | |
| | d6 = 2.546 | N3 = 1.77250 | ν3 = 49.77 |
| r7 = −6.841 | | | |
| | d7 = 0.750 | N4 = 1.75000 | ν4 = 25.14 |
| r8 = 5.573 | | | |
| | d8 = 2.042 | | |
| r9* = 6.103 | | | |
| | d9 = 2.502 | N5 = 1.52510 | ν5 = 56.38 |
| r10* = −8.403 | | | |
| | d10 = 0.554 | | |
| r11 = ∞ | | | |
| | d11 = 3.400 | N6 = 1.51680 | ν6 = 64.20 |
| r12 = ∞ | | | |

[Aspherical Surface Data of Second Surface (r2)]

ε = 1.0000
A4 = −0.32151 × $10^{-2}$
A6 = −0.61776 × $10^{-4}$
A8 = −0.26559 × $10^{-4}$

[Aspherical Surface Data of Ninth Surface (r9)]

ε = 1.0000
A4 = −0.30193 × $10^{-3}$
A6 = 0.70895 × $10^{-4}$
A8 = 0.13241 × $10^{-5}$

[Aspherical Surface Data of Tenth Surface (r10)]

ε = 1.0000
A4 = 0.25310 × $10^{-2}$
A6 = 0.18889 × $10^{-4}$
A8 = 0.79656 × $10^{-5}$

[Values of Condition (10) on Second Surface (r2)]

y = 0.00ymax . . . (x-x0)/(N'-N) = 0.00000
y = 0.20ymax . . . (x-x0)/(N'-N) = 0.00030
y = 0.40ymax . . . (x-x0)/(N'-N) = 0.00489
y = 0.60ymax . . . (x-x0)/(N'-N) = 0.02592
y = 0.80ymax . . . (x-x0)/(N'-N) = 0.08957
y = 1.00ymax . . . (x-x0)/(N'-N) = 0.25359

[Values of Condition (10) on Ninth Surface (r9)]

y = 0.00ymax . . . (x-x0)/(N'-N) = 0.00000
y = 0.20ymax . . . (x-x0)/(N'-N) = −0.00010
y = 0.40ymax . . . (x-x0)/(N'-N) = −0.00101
y = 0.60ymax . . . (x-x0)/(N'-N) = −0.00011
y = 0.80ymax . . . (x-x0)/(N'-N) = 0.02373
y = 1.00ymax . . . (x-x0)/(N'-N) = 0.14164

[Values of Condition (10) on Tenth Surface (r10)]

y = 0.00ymax . . . (x-x0)/(N'-N) = 0.00000
y = 0.20ymax . . . (x-x0)/(N'-N) = −0.00085
y = 0.40ymax . . . (x-x0)/(N'-N) = −0.01389
y = 0.60ymax . . . (x-x0)/(N'-N) = −0.07387
y = 0.80ymax . . . (x-x0)/(N'-N) = −0.25938
y = 1.00ymax . . . (x-x0)/(N'-N) = −0.75699

TABLE 10

Construction Data of Example 10 f = 4.75
FNO = 2.87

| Radius of Curvature | Axial Distance | Refractive Index | Abbe Number |
|---|---|---|---|
| r1* = −16.409 | | | |
| | d1 = 1.000 | N1 = 1.52510 | ν1 = 56.38 |
| r2* = 3.090 | | | |
| | d2 = 3.427 | | |
| r3 = 11.537 | | | |
| | d3 = 1.826 | N2 = 1.85000 | ν2 = 40.04 |
| r4 = −13.947 | | | |
| | d4 = 2.799 | | |
| r5 = ∞(A) | | | |
| | d5 = 1.200 | | |
| r6 = 14.134 | | | |
| | d6 = 2.638 | N3 = 1.77250 | ν3 = 49.77 |
| r7 = −4.734 | | | |
| | d7 = 0.750 | N4 = 1.75000 | ν4 = 25.14 |
| r8 = 14.443 | | | |
| | d8 = 2.331 | | |
| r9* = 6.298 | | | |
| | d9 = 2.374 | N5 = 1.52510 | ν5 = 56.38 |
| r10* = −12.035 | | | |
| | d10 = 0.500 | | |
| r11 = ∞ | | | |
| | d11 = 3.400 | N6 = 1.51680 | ν6 = 64.20 |
| r12 = ∞ | | | |

[Aspherical Surface Data of First Surface (r1)]

ε = 1.0000
A4 = 0.18968 × $10^{-2}$
A6 = −0.17409 × $10^{-3}$
A8 = 0.58303 × $10^{-5}$

[Aspherical Surface Data of Second Surface (r2)]

ε = 1.0000
A4 = −0.14087 × $10^{-2}$
A6 = −0.26121 × $10^{-3}$
A8 = −0.46363 × $10^{-4}$

[Aspherical Surface Data of Ninth Surface (r9)]

ε = 1.0000
A4 = 0.41700 × $10^{-4}$
A6 = 0.65832 × $10^{-4}$
A8 = 0.10742 × $10^{-5}$

[Aspherical Surface Data of Tenth Surface (r10)]

ε = 1.0000
A4 = 0.25448 × $10^{-2}$
A6 = 0.68837 × $10^{-4}$
A8 = 0.44660 × $10^{-5}$

[Values of Condition (10) on First Surface (r1)]

y = 0.00ymax . . . (x-x0)/(N'-N) = 0.00000
y = 0.20ymax . . . (x-x0)/(N'-N) = 0.00060
y = 0.40ymax . . . (x-x0)/(N'-N) = 0.00851
y = 0.60ymax . . . (x-x0)/(N'-N) = 0.03524
y = 0.80ymax . . . (x-x0)/(N'-N) = 0.08372
y = 1.00ymax . . . (x-x0)/(N'-N) = 0.14712

[Values of Condition (10) on Second Surface (r2)]

y = 0.00ymax . . . (x-x0)/(N'-N) = 0.00000
y = 0.20ymax . . . (x-x0)/(N'-N) = 0.00015
y = 0.40ymax . . . (x-x0)/(N'-N) = 0.00283
y = 0.60ymax . . . (x-x0)/(N'-N) = 0.01833
y = 0.80ymax . . . (x-x0)/(N'-N) = 0.08130
y = 1.00ymax . . . (x-x0)/(N'-N) = 0.29579

TABLE 10-continued

Construction Data of Example 10 f = 4.75
FNO = 2.87

| Radius of Curvature | Axial Distance | Refractive Index | Abbe Number |
|---|---|---|---|

[Values of Condition (10) on Ninth Surface (r9)]

y = 0.00ymax ... (x-x0)/(N'-N) = 0.00000
y = 0.20ymax ... (x-x0)/(N'-N) = 0.00003
y = 0.40ymax ... (x-x0)/(N'-N) = 0.00116
y = 0.60ymax ... (x-x0)/(N'-N) = 0.01181
y = 0.80ymax ... (x-x0)/(N'-N) = 0.06574
y = 1.00ymax ... (x-x0)/(N'-N) = 0.25899
[Values of Condition (10) on Tenth Surface (r10)]

y = 0.00ymax ... (x-x0)/(N'-N) = 0.00000
y = 0.20ymax ... (x-x0)/(N'-N) = −0.00092
y = 0.40ymax ... (x-x0)/(N'-N) = −0.01529
y = 0.60ymax ... (x-x0)/(N'-N) = −0.08330
y = 0.80ymax ... (x-x0)/(N'-N) = −0.29574
y = 1.00ymax ... (x-x0)/(N'-N) = −0.85079

TABLE 11

Construction Data of Example 11 f = 4.45
FNO = 2.87

| Radius of Curvature | Axial Distance | Refractive Index | Abbe Number |
|---|---|---|---|
| r1* = −14.669 | | | |
| | d1 = 1.000 | N1 = 1.52510 | ν1 = 56.38 |
| r2* = 3.184 | | | |
| | d2 = 4.546 | | |
| r3 = 11.731 | | | |
| | d3 = 1.859 | N2 = 1.85000 | ν2 = 40.04 |
| r4 = −13.911 | | | |
| | d4 = 2.535 | | |
| r5 = ∞(A) | | | |
| | d5 = 1.200 | | |
| r6 = 18.535 | | | |
| | d6 = 2.599 | N3 = 1.77250 | ν3 = 49.77 |
| r7 = −4.578 | | | |
| | d7 = 0.750 | N4 = 1.84666 | ν4 = 23.82 |
| r8 = 38.938 | | | |
| | d8 = 2.807 | | |
| r9* = 6.681 | | | |
| | d9 = 2.305 | N5 = 1.52510 | ν5 = 56.38 |
| r10* = −12.665 | | | |
| | d10 = 0.500 | | |
| r11 = ∞ | | | |
| | d11 = 3.400 | N6 = 1.51680 | ν6 = 64.20 |
| r12 = ∞ | | | |

[Aspherical Surface Data of First Surface (r1)]

ε = 1.0000
A4 = 0.26468 × 10$^{-2}$
A6 = −0.17738 × 10$^{-3}$
A8 = 0.46293 × 10$^{-5}$
[Aspherical Surface Data of Second Surface (r2)]

ε = 1.0000
A4 = −0.10075 × 10$^{-3}$
A6 = −0.58352 × 10$^{-4}$
A8 = −0.54769 × 10$^{-4}$

TABLE 11-continued

Construction Data of Example 11 f = 4.45
FNO = 2.87

| Radius of Curvature | Axial Distance | Refractive Index | Abbe Number |
|---|---|---|---|

[Aspherical Surface Data of Ninth Surface (r9)]

ε = 1.0000
A4 = −0.53743 × 10$^{-3}$
A6 = 0.11163 × 10$^{-3}$
A8 = 0.43934 × 10$^{-6}$
[Aspherical Surface Data of Tenth Surface (r10)]

ε = 1.0000
A4 = 0.15771 × 10$^{-2}$
A6 = 0.11216 × 10$^{-3}$
A8 = 0.52257 × 10$^{-5}$
[Values of Condition (10) on First Surface (r1)]

y = 0.00ymax ... (x-x0)/(N'-N) = 0.00000
y = 0.20ymax ... (x-x0)/(N'-N) = 0.00125
y = 0.40ymax ... (x-x0)/(N'-N) = 0.01806
y = 0.60ymax ... (x-x0)/(N'-N) = 0.07667
y = 0.80ymax ... (x-x0)/(N'-N) = 0.18952
y = 1.00ymax ... (x-x0)/(N'-N) = 0.34943
[Values of Condition (10) on Second Surface (r2)]

y = 0.00ymax ... (x-x0)/(N'-N) = 0.00000
y = 0.20ymax ... (x-x0)/(N'-N) = 0.00002
y = 0.40ymax ... (x-x0)/(N'-N) = 0.00051
y = 0.60ymax ... (x-x0)/(N'-N) = 0.00640
y = 0.80ymax ... (x-x0)/(N'-N) = 0.04913
y = 1.00ymax ... (x-x0)/(N'-N) = 0.26096
[Values of Condition (10) on Ninth Surface (r9)]

y = 0.00ymax ... (x-x0)/(N'-N) = 0.00000
y = 0.20ymax ... (x-x0)/(N'-N) = −0.00020
y = 0.40ymax ... (x-x0)/(N'-N) = −0.00220
y = 0.60ymax ... (x-x0)/(N'-N) = −0.00194
y = 0.80ymax ... (x-x0)/(N'-N) = 0.03541
y = 1.00ymax ... (x-x0)/(N'-N) = 0.22053
[Values of Condition (10) on Tenth Surface (r10)]

y = 0.00ymax ... (x-x0)/(N'-N) = 0.00000
y = 0.20ymax ... (x-x0)/(N'-N) = −0.00058
y = 0.40ymax ... (x-x0)/(N'-N) = −0.01021
y = 0.60ymax ... (x-x0)/(N'-N) = −0.06054
y = 0.80ymax ... (x-x0)/(N'-N) = −0.23806
y = 1.00ymax ... (x-x0)/(N'-N) = −0.75937

TABLE 12

Values Corresponding to Conditions (1), (1'), (2) to (5), and (7)

|  | Conditions (1) and (1')<br>$\|f \times fa/Ha^2 + f \times fb/Hb^2\|$ | Condition (2)<br>$\|(r1A + r1B)/(r1A - r1B)\|$ | Condition (3)<br>f/fl | Condition (4)<br>(r5A + r5B)/(r5A - r5B) | Condition (5)<br>D/f | Condition (7)<br>img × R |
|---|---|---|---|---|---|---|
| Example 1 | 30.31 | 14.76 | 0.19 | −1.43 | 0.13 | 10.58 |
| Example 2 | 59.57 | 11.18 | 0.03 | −0.72 | 0.27 | 10.58 |
| Example 3 | 39.16 | 35.49 | 0.09 | −1.05 | 0.20 | 10.58 |

TABLE 13

Values Corresponding to Conditions (8) and (8'), (9), and (11) to (13)

|  | Conditions (8) and (8')<br>$\|f \times fa/Ha^2 + f \times fb/Hb^2\|$ | Condition (9)<br>f/fF | Condition (11)<br>f/fS | Condition (12)<br>f/fP | Condition (13)<br>img × R |
|---|---|---|---|---|---|
| Example 4 | 0.57 | 0.38 | 0.060 | 0.47 | 10.95 |
| Example 5 | 0.32 | 0.36 | 0.123 | 0.42 | 11.09 |
| Example 6 | 0.04 | 0.40 | 0.106 | 0.38 | 11.29 |
| Example 7 | 0.58 | 0.45 | 0.077 | 0.35 | 10.85 |
| Example 8 | 0.37 | 0.05 | −0.002 | 0.81 | 10.95 |
| Example 9 | 0.73 | 0.15 | 0.002 | 0.71 | 10.89 |
| Example 10 | 0.84 | 0.15 | 0.060 | 0.58 | 11.05 |
| Example 11 | 0.56 | 0.27 | 0.028 | 0.51 | 11.05 |

What is claimed is:

1. A taking lens system comprising, in order from an object side:
   a front lens unit composed of two lens elements, one of which is a positive glass lens element and the other of which is a negative plastic lens element;
   an aperture stop; and
   a rear lens unit having a positive plastic lens element disposed at an image-side end thereof,
   wherein the following condition is fulfilled:

$|f \times fa/Ha^2 + f \times fb/Hb^2| \leq 300$ where
   f represents a focal length of the entire taking lens system;
   fa represents a focal length of the negative plastic lens element of the front lens unit;
   fb represents a focal length of the positive plastic lens element of the rear lens unit;
   Ha represents a height of incidence at which an axial F-number ray enters the negative plastic lens element of the front lens unit; and
   Hb represents a height of incidence at which an axial F-number ray enters the positive plastic lens element of the rear lens unit.

2. A taking lens system as claimed in claim 1, wherein said positive glass lens element is located on the object side of said front lens unit.

3. A taking lens system as claimed in claim 1, wherein said negative plastic lens element is located on the object side of said front lens unit.

4. A taking lens system as claimed in claim 1, wherein said rear lens element includes, on an object side of the positive plastic lens element, solely a lens element made of glass.

5. A taking lens system as claimed in claim 4, wherein said lens element made of glass is a doublet lens element.

6. A taking lens system as claimed in claim 5, wherein said doublet lens element is formed by cementing together a biconcave lens element and a biconvex lens element.

7. A taking lens system as claimed in claim 5, wherein said doublet lens element is formed by cementing together a biconvex lens element and a biconcave lens element.

8. A taking lens system as claimed in claim 5, wherein the doublet lens element of the rear lens unit fulfills the following condition:

$-0.05 \leq f/fS \leq 0.25$ where
   fS represents a focal length of the doublet lens element of the rear lens unit.

9. A taking lens system as claimed in claim 1, wherein the following condition is fulfilled:

$|f \times fa/Ha^2 + f \times fb/Hb^2| \leq 5.$

10. A taking lens system as claimed in claim 1, wherein the following condition is fulfilled:

$3 \leq (r1A + r1B)/(r1A - r1B) \leq 100$ where
    r1A represents a radius of curvature of an object-side surface of a positive object-side-end lens element; and
    r1B represents a radius of curvature of an image-side surface of the positive object-side-end lens element.

11. A taking lens system as claimed in claim 1, wherein the following condition is fulfilled:

$0.01 \leq f/f1 \leq 0.21$ where f1 represents a focal length of a positive object-side-end lens element.

12. A taking lens system as claimed in claim 1, wherein the following condition is fulfilled:

$-5.0 \leq (r5A + r5B)/(r5A - r5B) \leq -0.5$ where
    r5A represents a radius of curvature of an object-side surface of a positive image-side-end lens element; and
    r5B represents a radius of curvature of an image-side surface of the positive image-side-end lens element.

13. A taking lens system as claimed in claim 1, wherein the following condition is fulfilled:

$0.05 \leq D/f \leq 0.50$ where
    D represents an air gap between a positive image-side-end lens element and a lens element disposed on the object side of this positive image-side-end lens element.

14. A taking lens system as claimed in claim 1,
wherein, the negative lens element of the front lens unit has, at least on one side thereof, an aspherical surface whose maximum effective radius is represented by ymax, and the following condition is fulfilled for a height y in a direction perpendicular to an optical axis in the range 0.7ymax<y<1.0ymax, $$0.01 \leq (x-x0)/(N'-N) \leq 3.0$$

where
- x represents a deviation (mm) of the aspherical surface along the optical axis at the height in a direction perpendicular to the optical axis (a direction pointing to the object side is negative);
- x0 represents a deviation (mm) of a reference spherical surface of the aspherical surface along the optical axis at the height in a direction perpendicular to the optical axis (the direction pointing to the object side is negative);
- N represents a refractive index of an object-side medium of the aspherical surface for d line; and
- N' represents a refractive index of an image-side medium of the aspherical surface for d line.

15. A taking lens system as claimed in claim 1,
wherein, the positive image-side-end lens element of the rear lens unit has, at least on one side thereof, an aspherical surface whose maximum effective radius is represented by ymax, and the following condition is fulfilled for a height y in a direction perpendicular to an optical axis in the range 0.7ymax<y<1.0ymax, $$0.01 \leq (x-x0)/(N'-N) \leq 3.0$$

where
- x represents a deviation (mm) of the aspherical surface along the optical axis at the height in a direction perpendicular to the optical axis (a direction pointing to the object side is negative);
- x0 represents a deviation (mm) of a reference spherical surface of the aspherical surface along the optical axis at the height in a direction perpendicular to the optical axis (the direction pointing to the object side is negative);
- N represents a refractive index of an object-side medium of the aspherical surface for d line; and
- N' represents a refractive index of an image-side medium of the aspherical surface for d line.

16. A taking lens system as claimed in claim 1,
wherein the following condition is fulfilled:

$$1 \leq img \times R \leq 15$$

where
- img represents a maximum image height; and
- R represents an effective diameter of an image-side-end surface.

17. A taking lens system comprising, in order from an object side:
- a front lens unit composed of two lens elements that are, from the object side, a negative plastic lens element and a positive glass lens element;
- an aperture stop; and
- a rear lens unit having a positive plastic lens element disposed at an image-side end thereof, wherein the following condition is fulfilled:

$$|i\, f \times fa/Ha^2 + f \times fb/Hb^2| \leq 5$$

where
- f represents a focal length of the entire taking lens system;
- fa represents a focal length of the negative plastic lens element of the front lens unit;
- fb represents a focal length of the positive plastic lens element of the rear lens unit;
- Ha represents a height of incidence at which an axial F-number ray enters the negative plastic lens element of the front lens unit; and
- Hb represents a height of incidence at which an axial F-number ray enters the positive plastic lens element of the rear lens unit.

18. A taking lens system as claimed in claim 17, wherein the following condition is fulfilled:

$$0.01 \leq f/fF \leq 0.91$$

where
- fF represents a focal length of the front lens unit.

19. A taking lens system as claimed in claim 17, wherein, the negative lens element of the front lens unit has, at least on one side thereof, an aspherical surface whose maximum effective radius is represented by ymax, and the following condition is fulfilled for a height y in a direction perpendicular to an optical axis in the range 0.7ymax<y<1.0ymax, $$b\ 0.01 \leq (x-x0)/(N'-N) \leq 2.0$$

where
- x represents a deviation (mm) of the aspherical surface along the optical axis at the height in a direction perpendicular to the optical axis (a direction pointing to the object side is negative);
- x0 represents a deviation (mm) of a reference spherical surface of the aspherical surface along the optical axis at the height in a direction perpendicular to the optical axis (the direction pointing to the object side is negative);
- N represents a refractive index of an object-side medium of the aspherical surface for d line; and
- N' represents a refractive index of an image-side medium of the aspherical surface for d line.

20. A taking lens system as claimed in claim 17, wherein, the positive image-side-end lens element of the rear lens unit has, at least on one side thereof, an aspherical surface whose maximum effective radius is represented by ymax, and the following condition is fulfilled for a height y in a direction perpendicular to an optical axis in the range 0.7ymax<y<1.0ymax, $$0.01 \leq (x-x0)/(N'-N) \leq 2.0$$

where
- x represents a deviation (mm) of the aspherical surface along the optical axis at the height in a direction perpendicular to the optical axis (a direction pointing to the object side is negative);
- x0 represents a deviation (mm) of a reference spherical surface of the aspherical surface along the optical axis at the height in a direction perpendicular to the optical axis (the direction pointing to the object side is negative);

N represents a refractive index of an object-side medium of the aspherical surface for d line; and N' represents a refractive index of an image-side medium of the aspherical surface for d line.

21. A taking lens system as claimed in claim 17, wherein the rear lens unit is composed of, from the object side, a doublet lens element formed by cementing together a biconcave lens element and a biconvex lens element, and a positive plastic lens element.

22. A taking lens system as claimed in claim 17, wherein the rear lens unit is composed of, from the object side, a doublet lens element formed by cementing together a biconvex lens element and a biconcave lens element, and a positive plastic lens element.

23. A taking lens system as claimed in claim 21, wherein the doublet lens element of the rear lens unit fulfills the following condition:

$$-0.05 \leq f/fS \leq 0.25$$

where fS represents a focal length of the doublet lens element of the rear lens unit.

24. A taking lens system as claimed in claim 21, wherein the positive image-side-end lens element of the rear lens unit fulfills the following condition:

$$0.23 \leq f/fP \leq 0.1717$$

where fP represents a focal length of the positive image-side-end lens element of the rear lens unit.

25. A taking lens system as claimed in claim 17, wherein the following condition is fulfilled:

$$1 \leq img \times R \leq 15$$

where img represents a maximum image height; and

R represents an effective diameter of an image-side-end surface.

26. A digital camera, comprising, from an object side:

a taking lens system;

a low-pass filter; and an image sensor, wherein said taking lens system includes:

a front lens unit composed of two lens elements, one of which is a positive glass lens element and the other of which is a negative plastic lens element;

an aperture stop; and a rear lens unit having a positive plastic lens element disposed at an image-side end thereof, and wherein the following condition is fulfilled:

$$|f \times fa/Ha^2 + f \times fb/Hb^2| \leq 300$$

where f represents a focal length of the entire taking lens system;

fa represents a focal length of the negative plastic lens element of the front lens unit;

fb represents a focal length of the positive plastic lens element of the rear lens unit;

Ha represents a height of incidence at which an axial F-number ray enters the negative plastic lens element of the front lens unit; and Hb represents a height of incidence at which an axial F-number ray enters the positive plastic lens element of the rear lens unit.

27. A digital camera as claimed in claim 26, wherein said positive glass lens element is located on the object side of said front lens unit.

28. A digital camera as claimed in claim 26, wherein said negative plastic lens element is located on the object side of said front lens unit.

29. A digital camera as claimed in claim 26, wherein said rear lens element includes, on an object side of the positive plastic lens element, solely a lens element made of glass.

30. A digital camera as claimed in claim 29, wherein said lens element made of glass is a doublet lens element.

31. A digital camera as claimed in claim 30, wherein said doublet lens element is formed by cementing together a biconcave lens element and a biconvex lens element.

32. A digital camera as claimed in claim 30, wherein said doublet lens element is formed by cementing together a biconvex lens element and a biconcave lens element.

33. A digital camera as claimed in claim 26, wherein the following condition is fulfilled:

$$|f \times fa/Ha^2 + f \times fb/Hb^2| \leq 5.$$

34. A digital camera, comprising, from an object side:

a taking lens system;

a low-pass filter; and an image sensor, wherein said taking lens system includes:

a front lens unit composed of two lens elements that are, from the object side, a negative plastic lens element and a positive glass lens element;

an aperture stop; and a rear lens unit having a positive plastic lens element disposed at an image-side end thereof, wherein the following condition is fulfilled:

$$|f \times fa/Ha^2 + f \times fb/Hb^2| \leq 5$$

where f represents a focal length of the entire taking lens system;

fa represents a focal length of the negative plastic lens element of the front lens unit;

fb represents a focal length of the positive plastic lens element of the rear lens unit;

Ha represents a height of incidence at which an axial F-number ray enters the negative plastic lens element of the front lens unit; and Hb represents a height of incidence at which an axial F-number ray enters the positive plastic lens element of the rear lens unit.

* * * * *